(12) United States Patent
Nurenberg et al.

(10) Patent No.: US 7,880,085 B2
(45) Date of Patent: Feb. 1, 2011

(54) WALL MOUNT ASSEMBLY

(75) Inventors: Aundrea Nurenberg, Brown City, MI (US); Michael C. Clark, Columbiaville, MI (US)

(73) Assignee: Tapco International Corporation, Wixom, MI (US)

( * ) Notice: Subject to any disclaimer, the term of this patent is extended or adjusted under 35 U.S.C. 154(b) by 233 days.

(21) Appl. No.: 12/147,305

(22) Filed: Jun. 26, 2008

(65) Prior Publication Data
US 2008/0256880 A1 Oct. 23, 2008

Related U.S. Application Data

(63) Continuation-in-part of application No. 11/614,635, filed on Dec. 21, 2006, now Pat. No. 7,408,111.

(60) Provisional application No. 60/753,167, filed on Dec. 22, 2005.

(51) Int. Cl.
*H02G 3/14* (2006.01)
(52) U.S. Cl. ................... 174/66; 174/67; 312/328; D13/177
(58) Field of Classification Search .......... 174/66, 174/67; 220/241, 242; 312/328; D8/353; D13/177
See application file for complete search history.

(56) References Cited

U.S. PATENT DOCUMENTS

| | | | | |
|---|---|---|---|---|
| 5,594,206 A * | 1/1997 | Klas et al. | ................ | 174/56 |
| 6,610,927 B2 * | 8/2003 | Dinh et al. | ................ | 174/66 |
| 6,951,081 B2 | 10/2005 | Bonshor | | |
| 7,151,221 B1 * | 12/2006 | Backofen et al. | ........... | 174/67 |
| 7,166,799 B2 * | 1/2007 | Chen et al. | ................ | 174/50 |
| 7,516,578 B2 * | 4/2009 | Bonshor | ................ | 52/97 |
| 7,566,035 B2 | 7/2009 | Bonshor | | |
| 2006/0213132 A1 | 9/2006 | Bonshor | | |
| 2006/0277857 A1 | 12/2006 | Bonshor | | |
| 2007/0044393 A1 | 3/2007 | Bonshor | | |
| 2007/0175168 A1 | 8/2007 | Bonshor | | |

* cited by examiner

*Primary Examiner*—Dhiru R Patel
(74) *Attorney, Agent, or Firm*—Howard & Howard Attorneys PLLC

(57) ABSTRACT

A water deflection system is provided for use with a wall mounting assembly, wherein the water deflecting system and the wall mounting assembly are suitable for mounting to a wall of a structure, such as a building. The mounting plate and the cover plate of the wall mounting assembly are spaced apart from one another and/or provide sufficient clearance to allow for a downward flow of water therebetween. The water deflection system interrupts, channels, and/or directs this downward flow of water and safely diverts the water away from the region proximate to the top portion of the cut hole towards a region proximate to and/or below the bottom of the cut hole, thereby preventing the damage associated with water being introduced behind the siding.

41 Claims, 23 Drawing Sheets

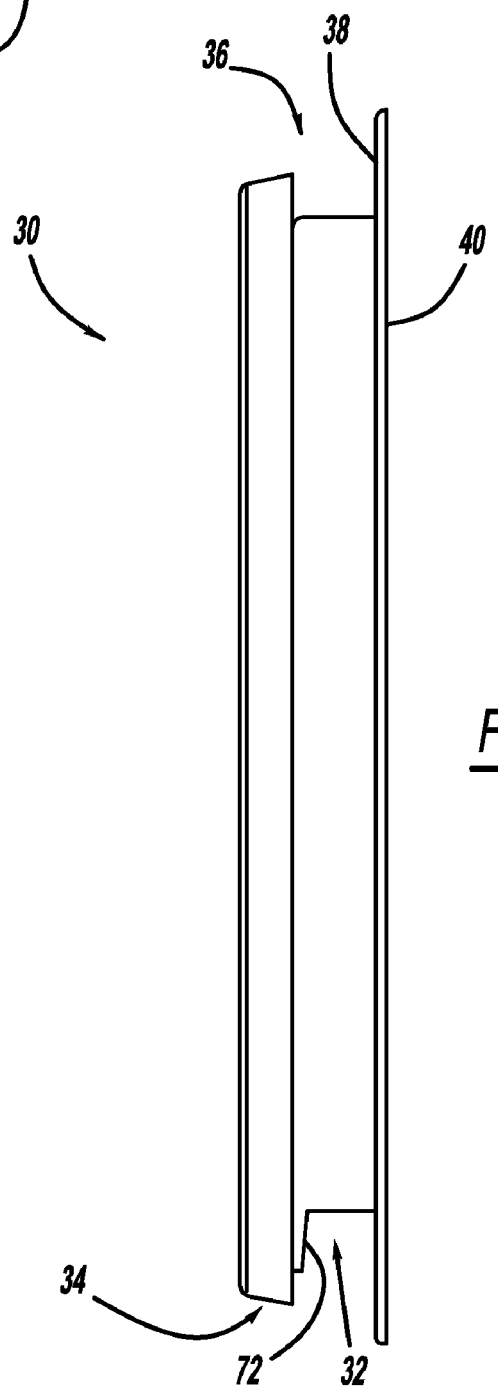

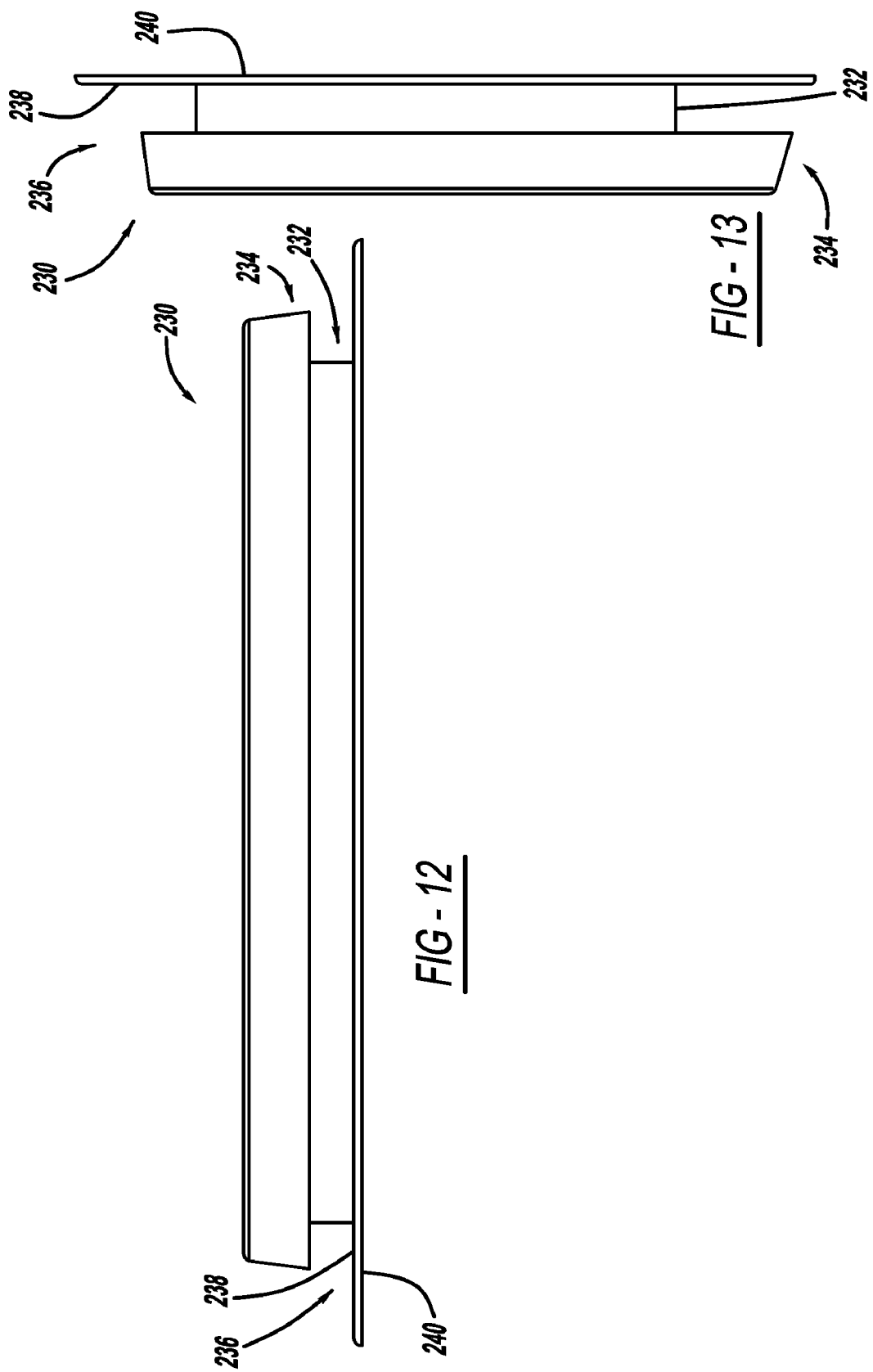

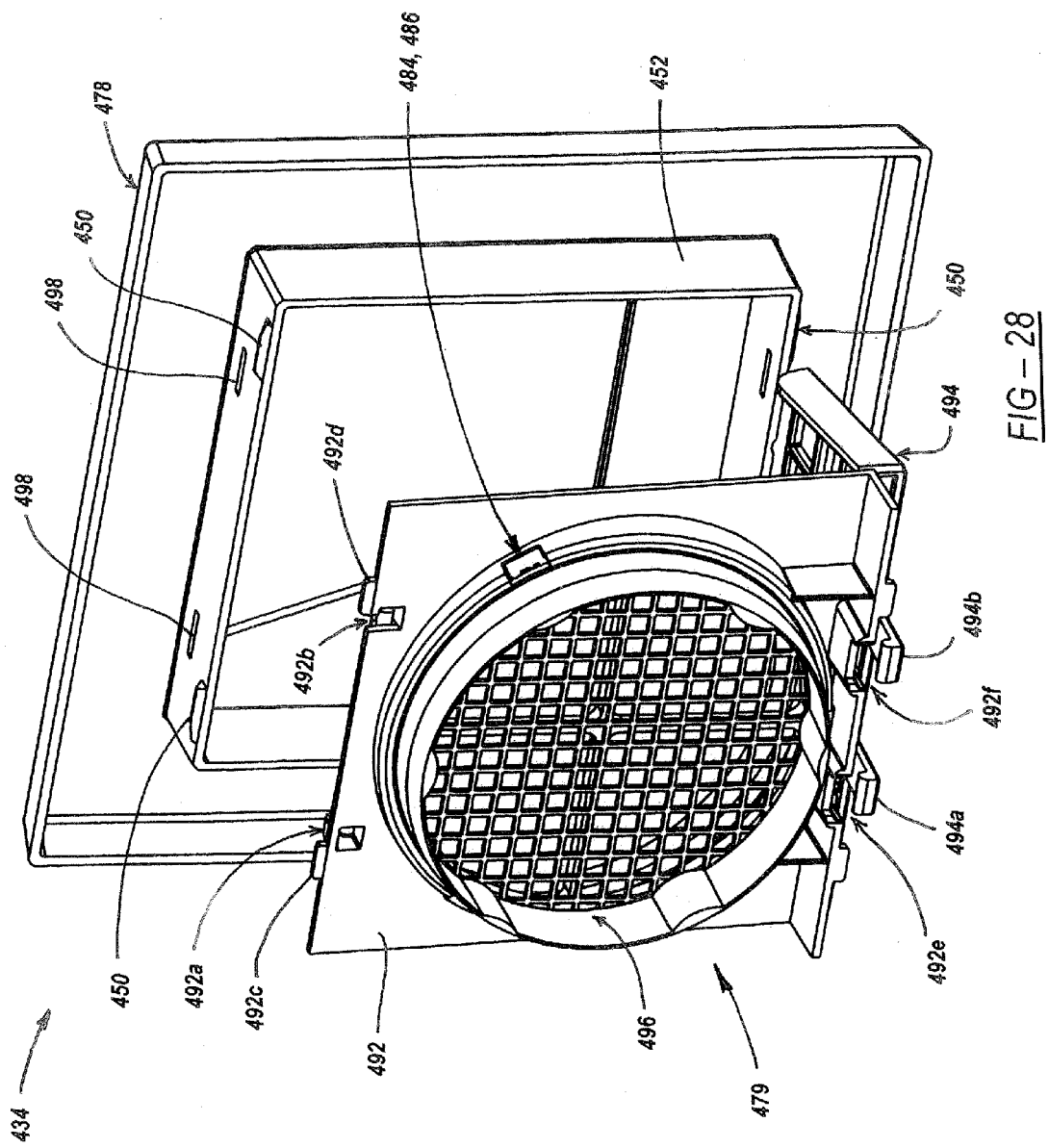

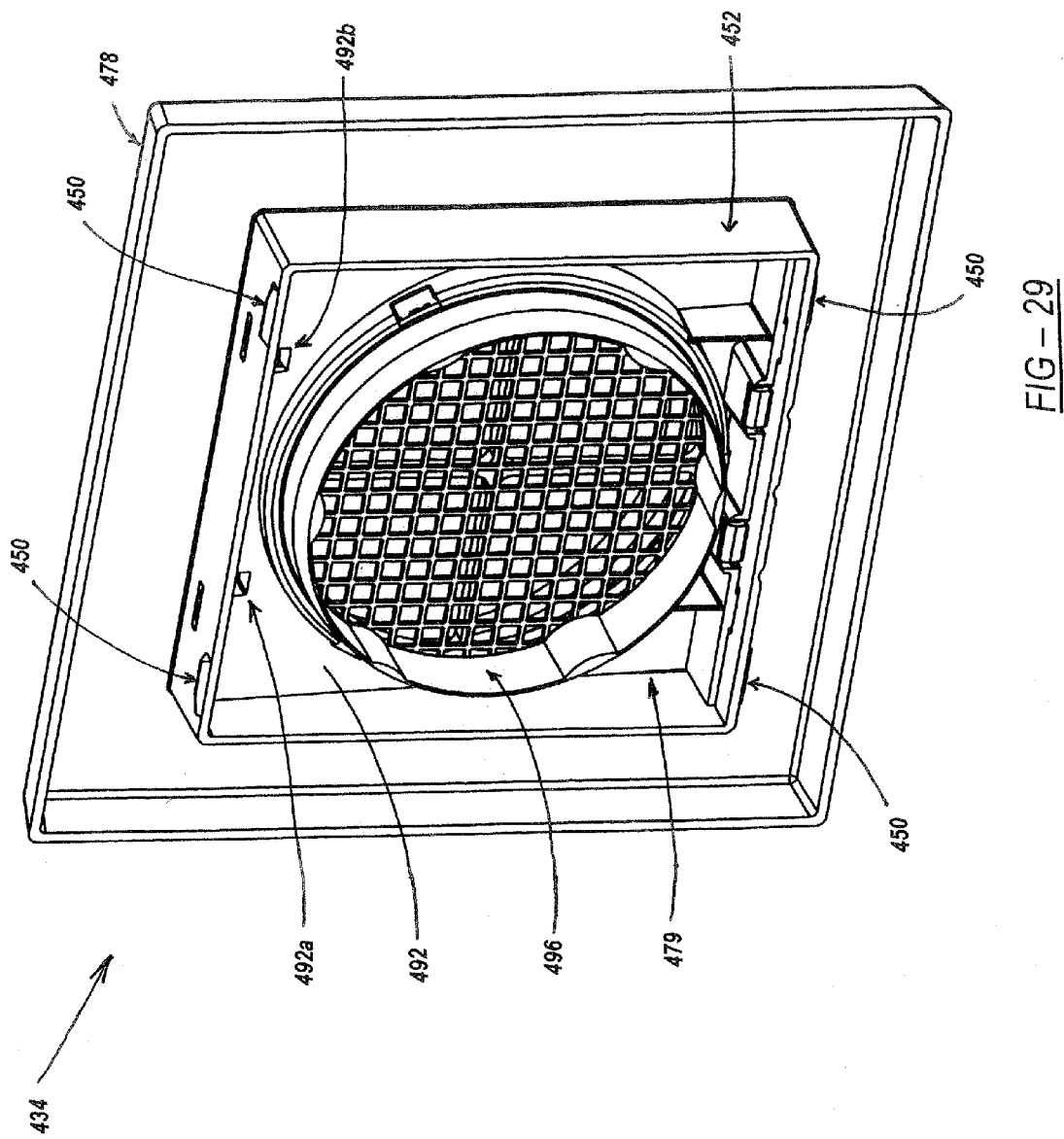

WALL MOUNT ASSEMBLY

CROSS-REFERENCE TO RELATED APPLICATION

The instant application is a continuation-in-part of U.S. patent application Ser. No. 11/614,635, filed Dec. 21, 2006, now U.S. Pat. No. 7,408,111, which claims priority to U.S. Provisional Patent Application Ser. No. 60/753,167, filed Dec. 22, 2005, the entire specifications of both of which are expressly incorporated herein by reference.

BACKGROUND OF THE INVENTION a. Field of the Invention

The present invention generally relates to a water deflection system and more particularly to a water deflection apparatus for use with wall mounting assemblies.

b. Description of the Related Art

Buildings and other structures with siding overlays such as vinyl or aluminum siding are often provided with external fixtures which serve both functional and decorative purposes. For example lights, electrical outlets, dryer vents, hose bibs, and decorative items such as address numbers are often mounted on the outside of buildings and other structures with siding overlays. Due to the stepped and uneven surface of the siding, wall mounting assemblies are often used in conjunction with the siding to provide a flat surface on which to mount the external fixtures.

It can be appreciated that a hole must be cut in the siding in order to install the wall mounting assemblies. The continuous surface of the siding is therefore interrupted and the water-shedding capability of the siding is compromised by water seeping into the cut hole. Thus, builders and contractors have recognized the need for a water deflection system that may be used in conjunction with a wall mounting assembly to deflect water that has seeped into the cut out and may be introduced behind the surface of the siding where rot or other damage may occur.

Various attempts have been made to overcome this problem, including those described in commonly-assigned U.S. Pat. No. 6,951,081 to Bonshor and U.S. Patent Publication Nos. US 2006/0213132 A1 to Bonshor; US 2006/0277857 A1 to Bonshor; US 2007/0044393 A1 to Bonshor; US 2007/004401 A1 to Bonshor; and US 2007/0175168 A1 to Bonshor, the entire specifications of all of which are expressly incorporated herein by reference.

Accordingly, there exists a need for new and improved wall mount assemblies that overcome at least one of the aforementioned problems.

SUMMARY OF THE INVENTION

In accordance with the general teachings of the present invention, a water deflection system is provided for use with a wall mounting assembly, wherein the water deflecting system and the wall mounting assembly are suitable for mounting to a wall of a structure, such as a building. The wall mounting assembly includes a mounting plate and a cover plate. The mounting plate and the cover plate of the wall mounting assembly are spaced apart from one another and/or provide sufficient clearance to allow for a downward flow of water therebetween. The water deflection system interrupts, channels, and/or directs this downward flow of water and safely diverts the water away from the region proximate to the top portion of the cut hole towards a region proximate to and/or below the bottom of the cut hole, thereby preventing the damage associated with water being introduced behind the siding. The water then harmlessly flows down the outside or exterior surface of the siding and/or drips onto the ground, thus never having a chance to penetrate into the cut hole and infiltrate the area around or behind the cut hole.

Further areas of applicability of the present invention will become apparent from the detailed description provided hereinafter. It should be understood that the detailed description and specific examples, while indicating the preferred embodiment of the invention, are intended for purposed of illustration only and are not intended to limit the scope of the invention.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a bottom view of the wall mount assembly shown in FIG. 1;

FIG. 3 is a side view of the wall mount assembly shown in FIG. 1;

FIG. 12 is a bottom view of the wall mount assembly shown in FIG. 11;

FIG. 13 is a side view of the wall mount assembly shown in FIG. 11;

FIG. 28 is a partially exploded, rear perspective view of the cover member of the wall mount assembly shown in FIG. 21; and FIG. 29 is a rear perspective view of the cover member of FIG. 28.

The same reference numerals refer to the same parts throughout the various Figures.

DETAILED DESCRIPTION OF THE INVENTION

Figure 1:
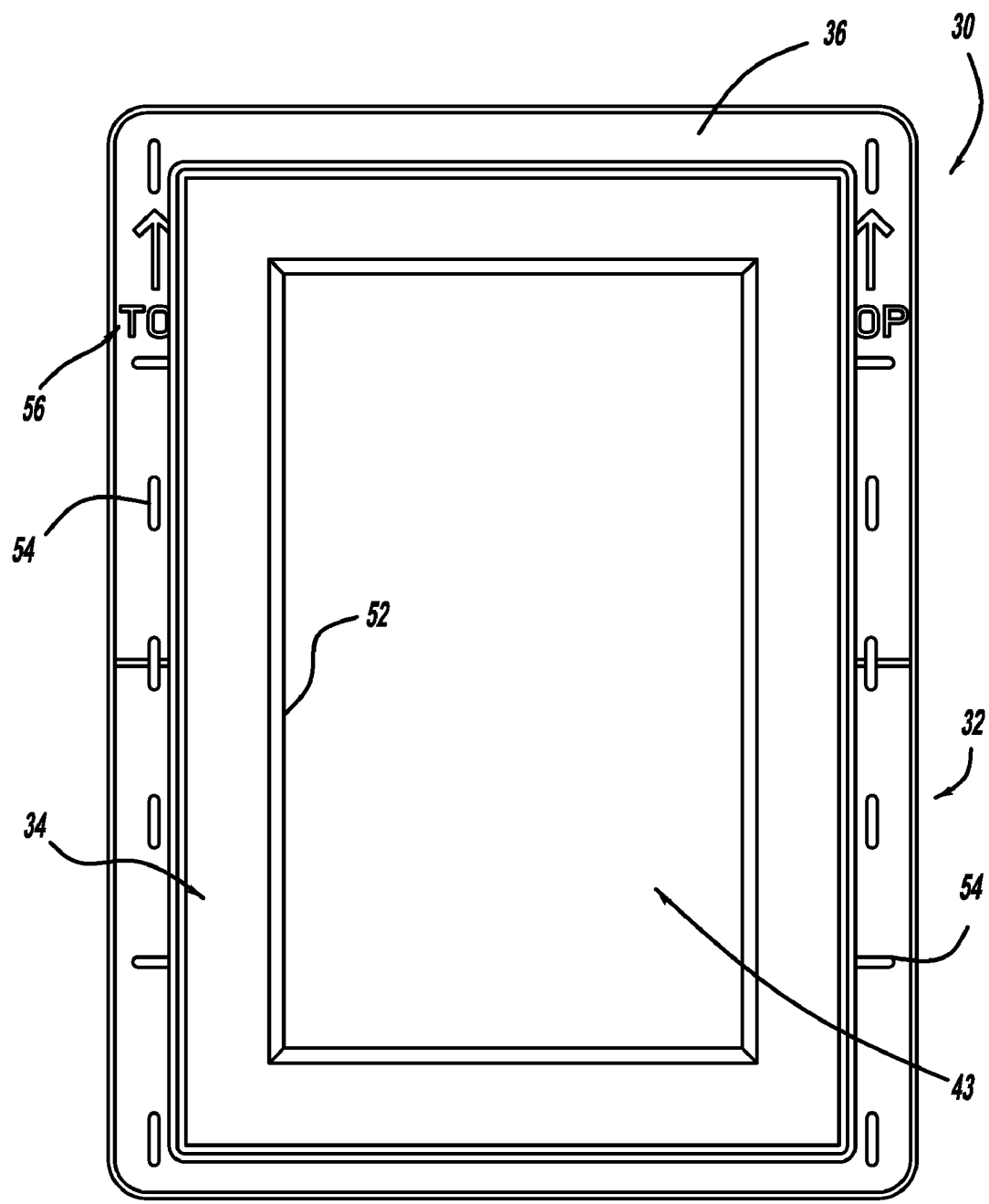
FIG. 1 is a front view of a first embodiment of a wall mount assembly according to the present invention.
Figure 4:
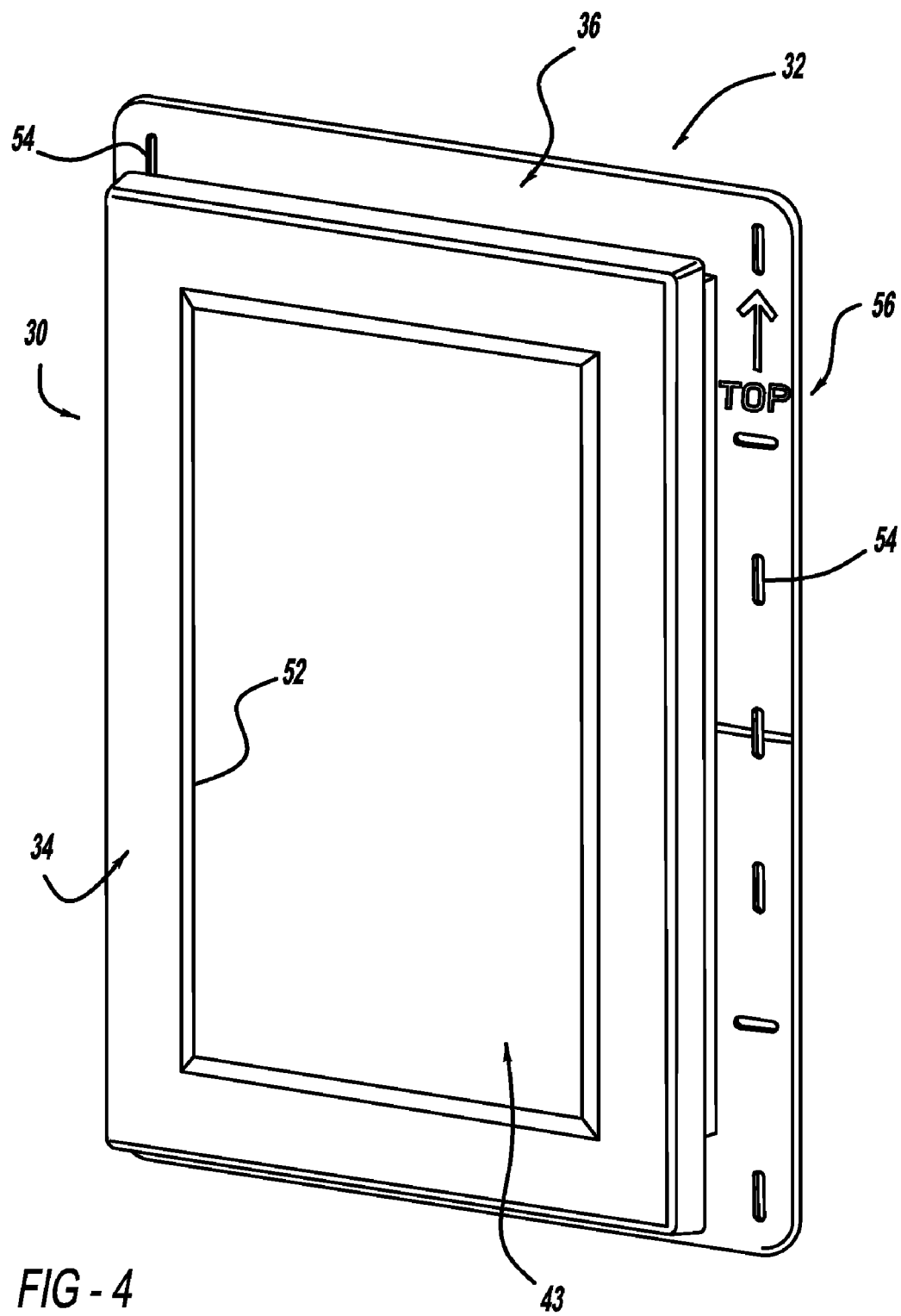
FIG. 4 is a front perspective view of the wall mount assembly shown in FIG. 1.
Figure 5:
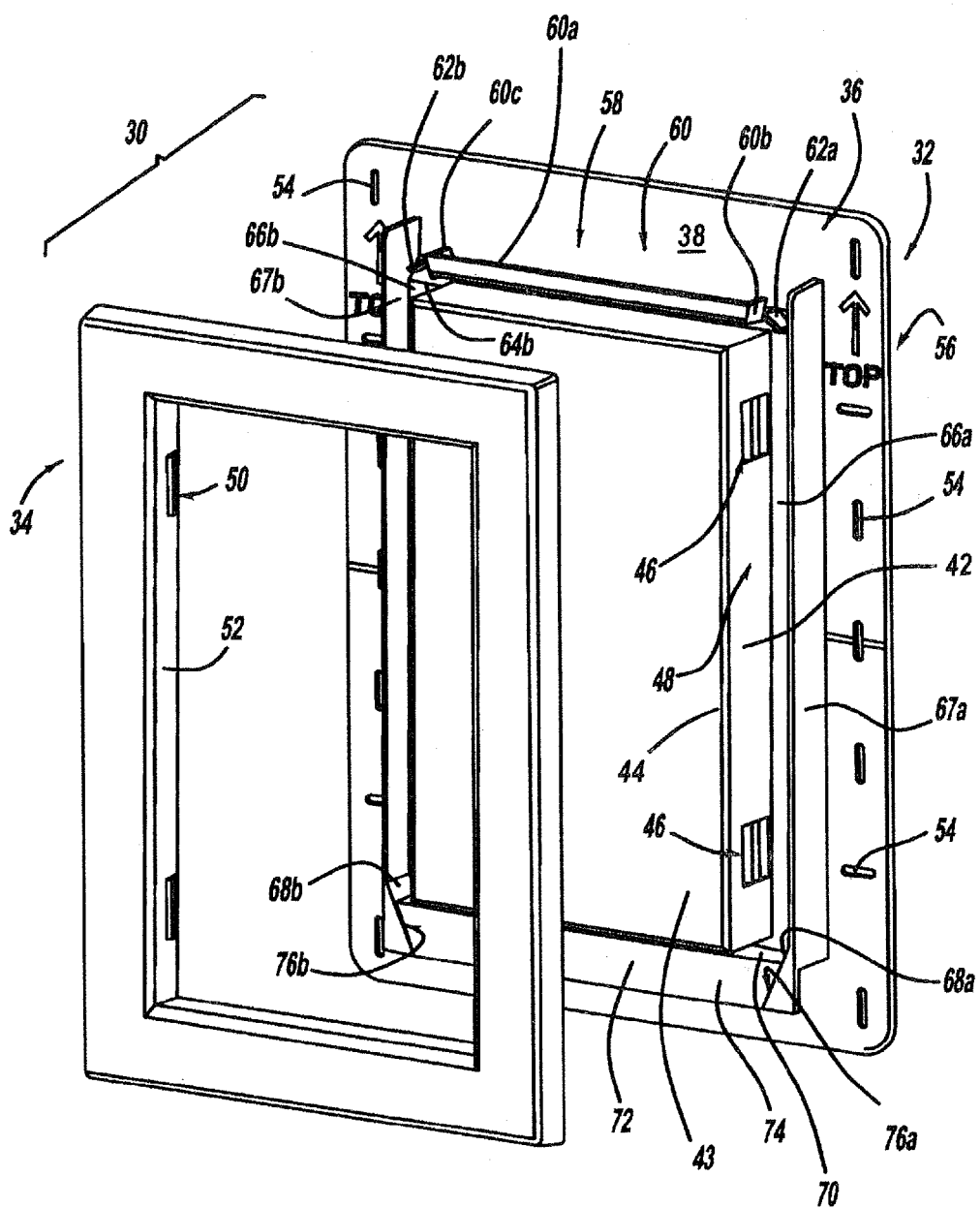
FIG. 5 is an exploded front perspective view of the wall mount assembly shown in FIG. 1.
Figure 6:
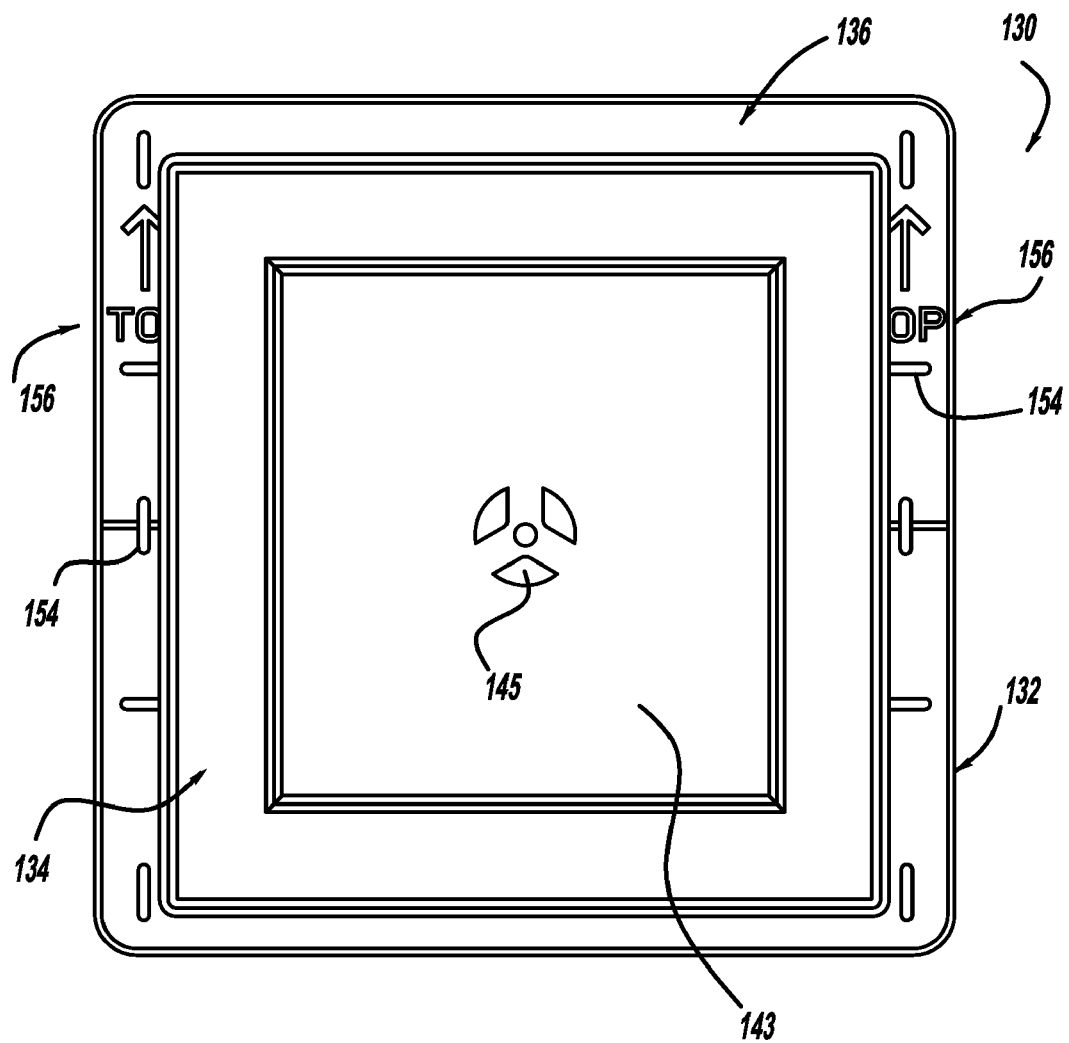
FIG. 6 is a front view of a second embodiment of a wall mount assembly according to the present invention.
Figure 7:
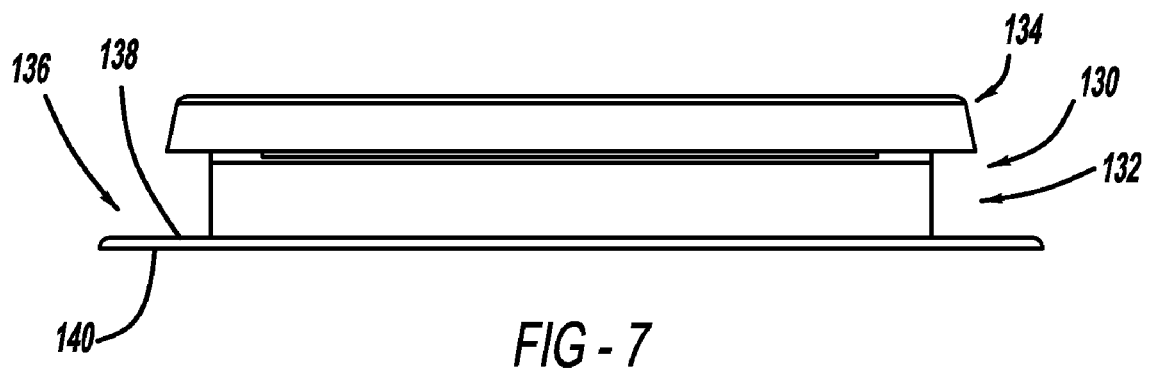
FIG. 7 is a bottom view of the wall mount assembly shown in FIG. 6.
Figure 8:
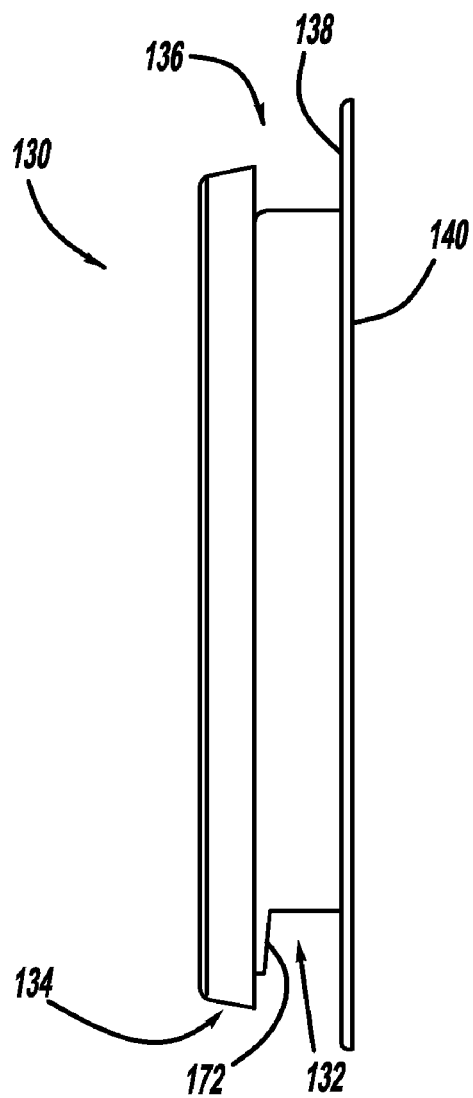
FIG. 8 is a side view of the wall mount assembly shown in FIG. 6.
Figure 9:
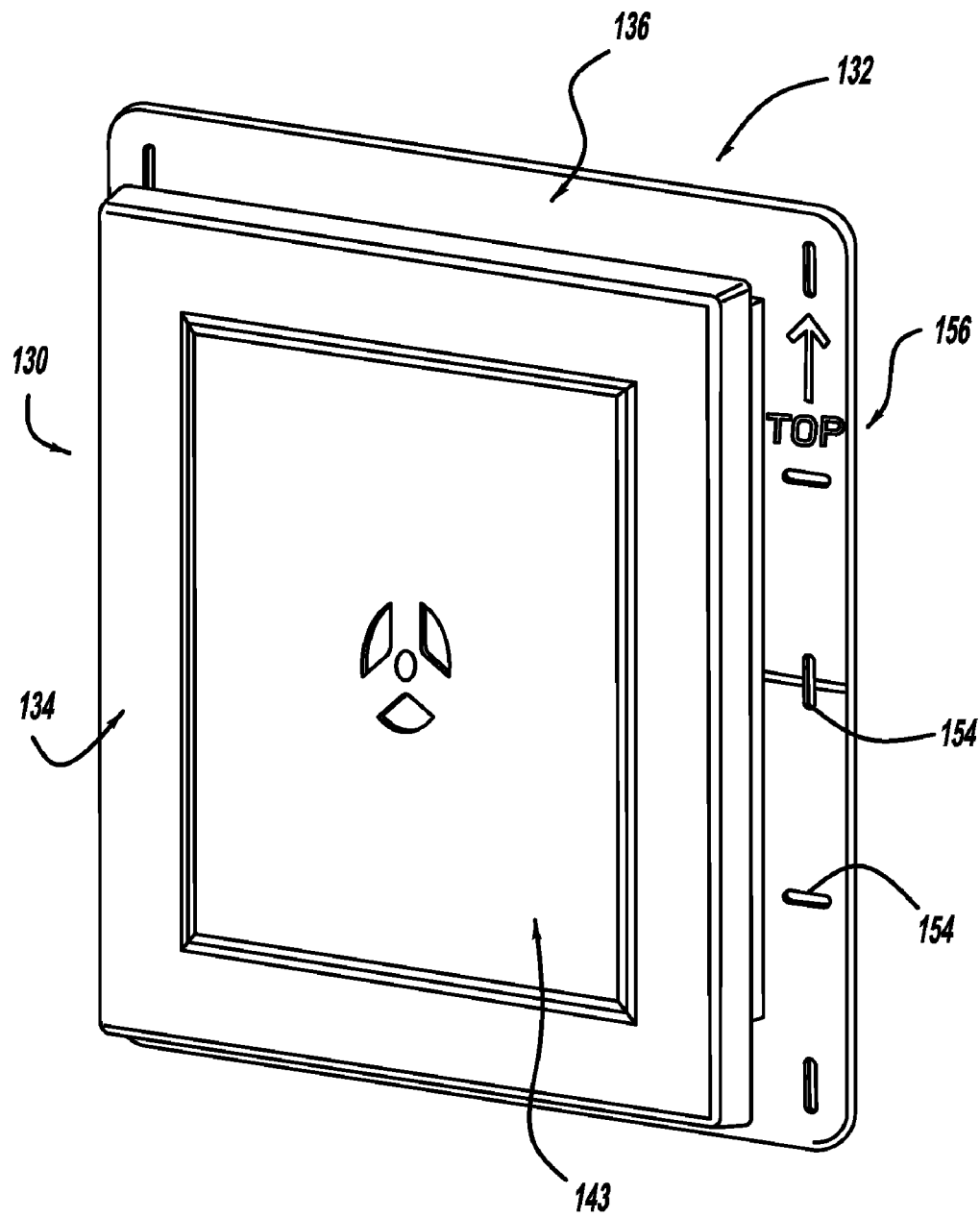
FIG. 9 is a front perspective view of the wall mount assembly shown in FIG. 6.
Figure 10:
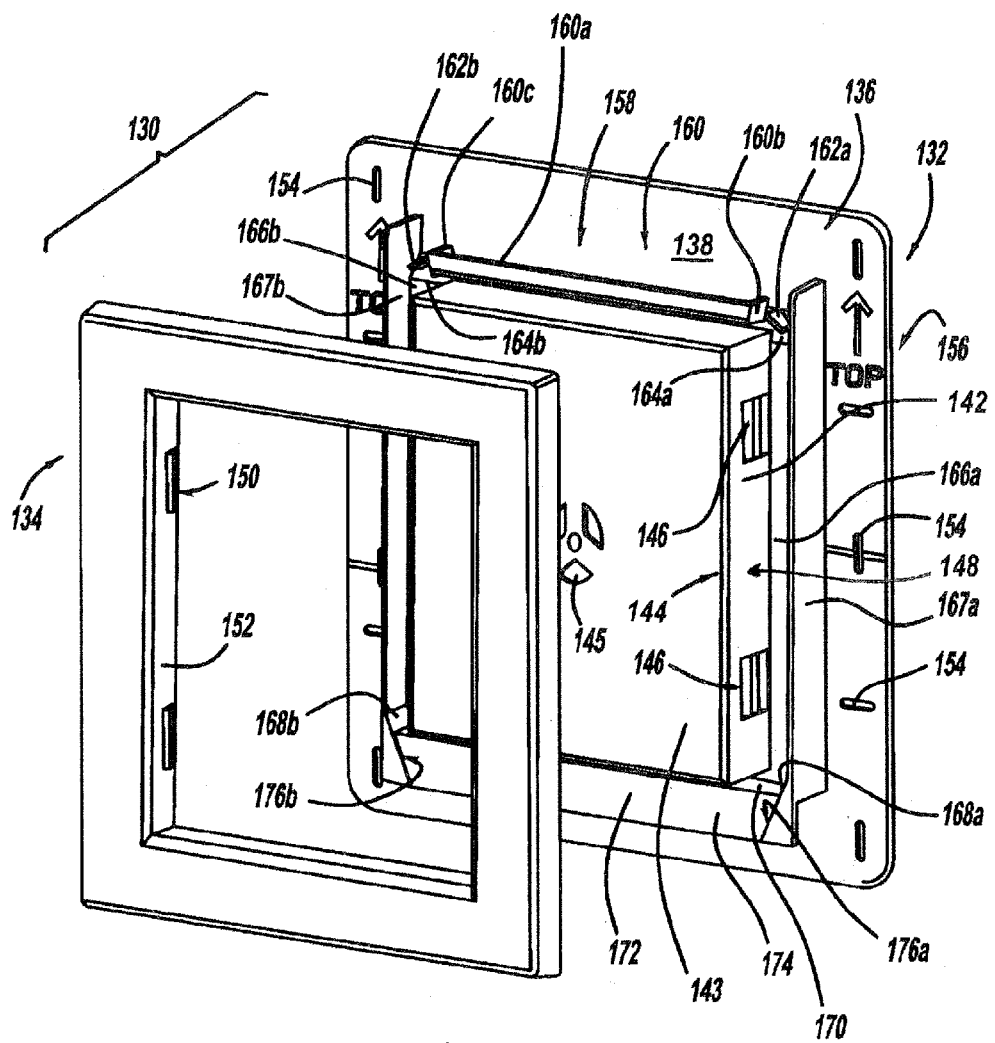
FIG. 10 is an exploded front perspective view of the wall mount assembly shown in FIG. 6.
Figure 11:
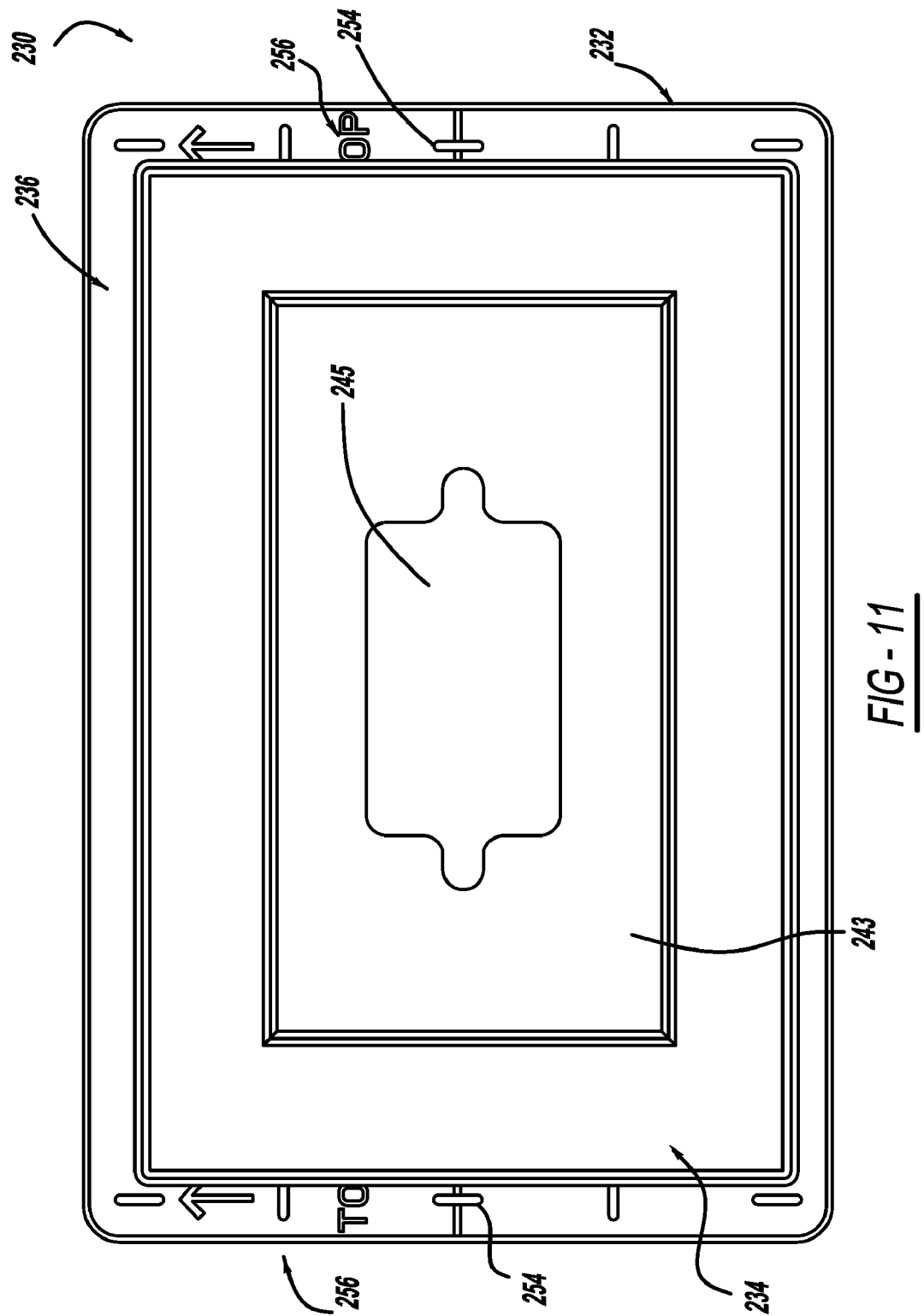
FIG. 11 is a front view of a third embodiment of a wall mount assembly according to the present invention.
Figure 14:
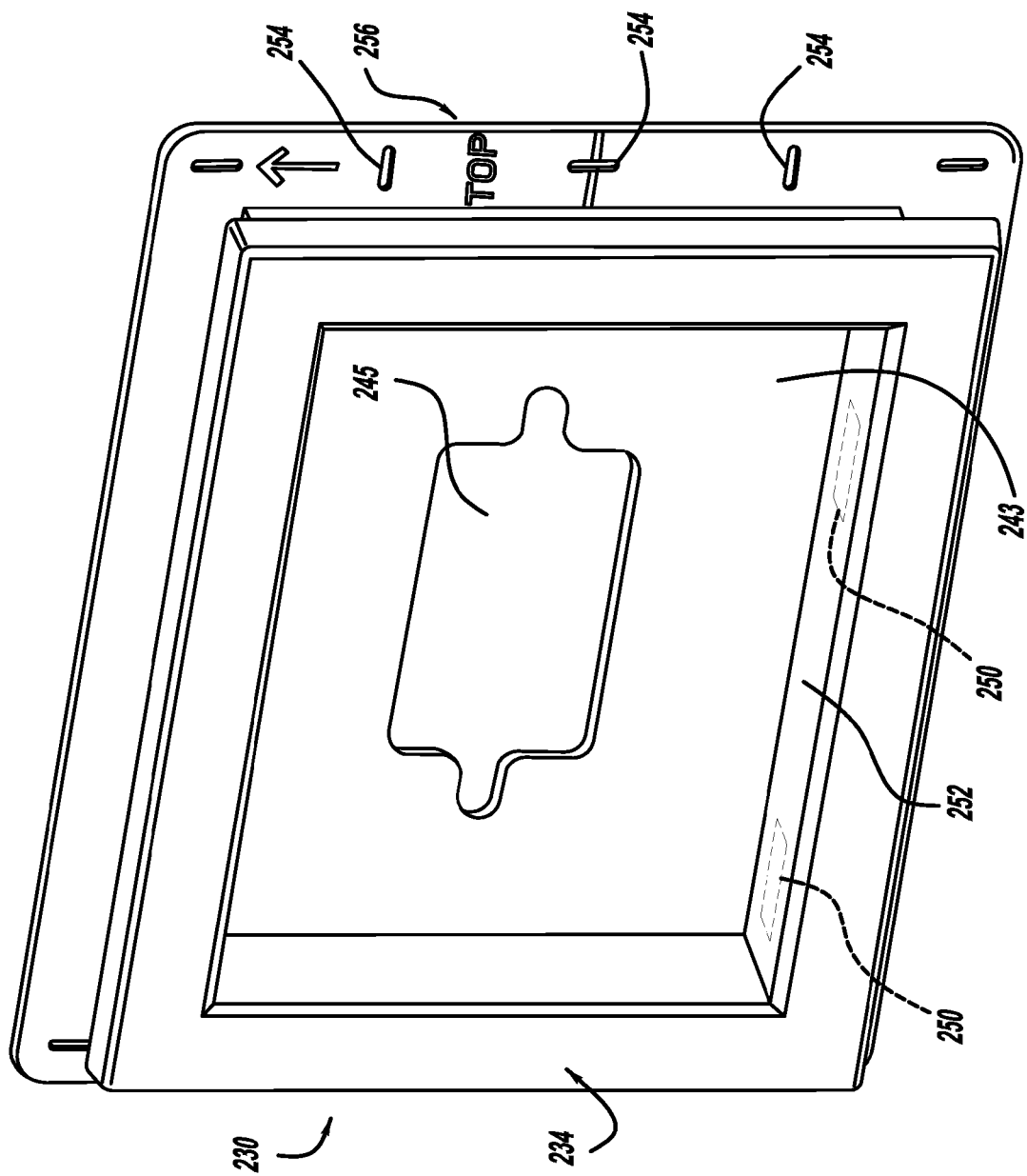
FIG. 14 is a front perspective view of the wall mount assembly shown in FIG. 11.
Figure 15:
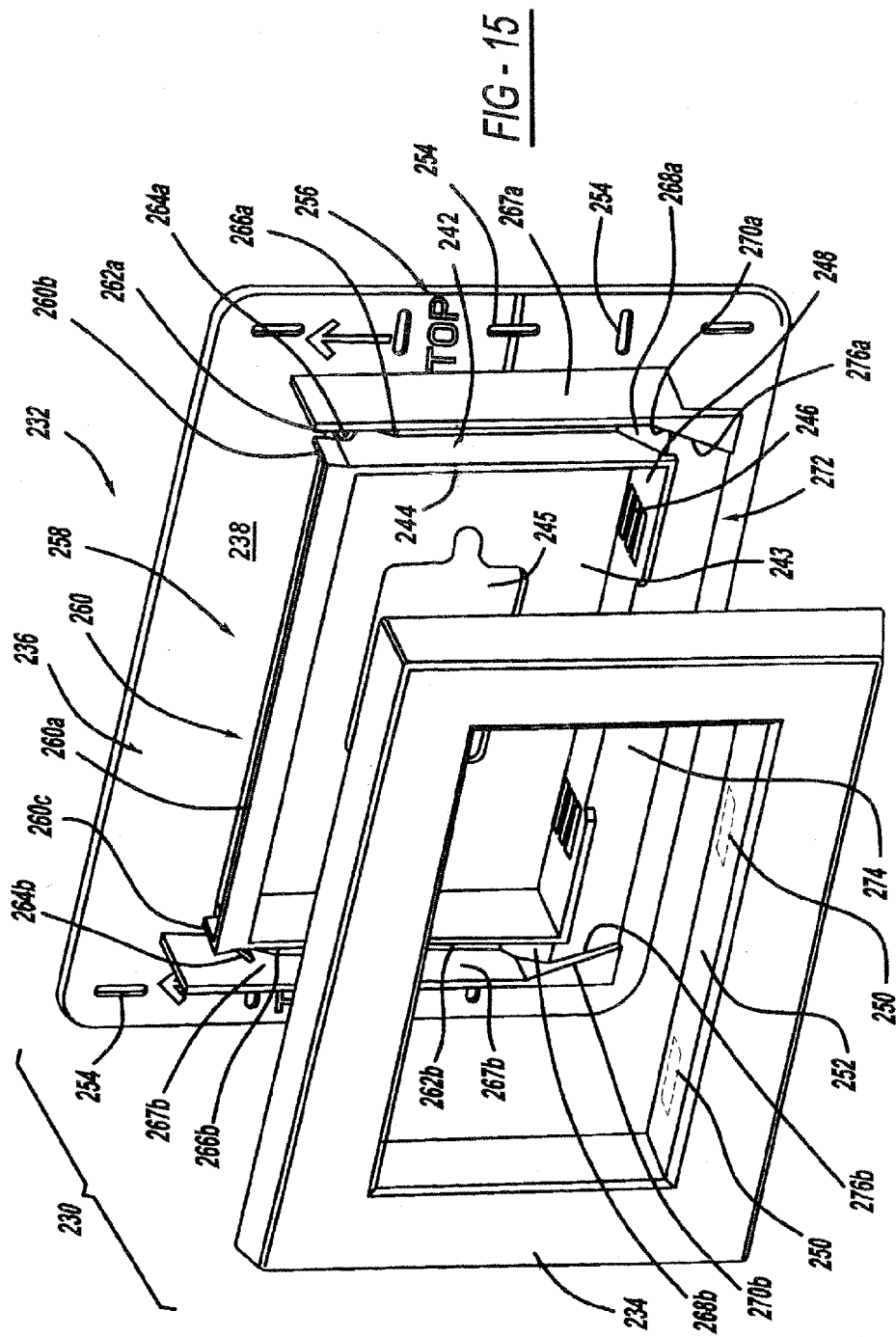
FIG. 15 is an exploded front perspective view of the wall mount assembly shown in FIG. 11.
Figure 16:
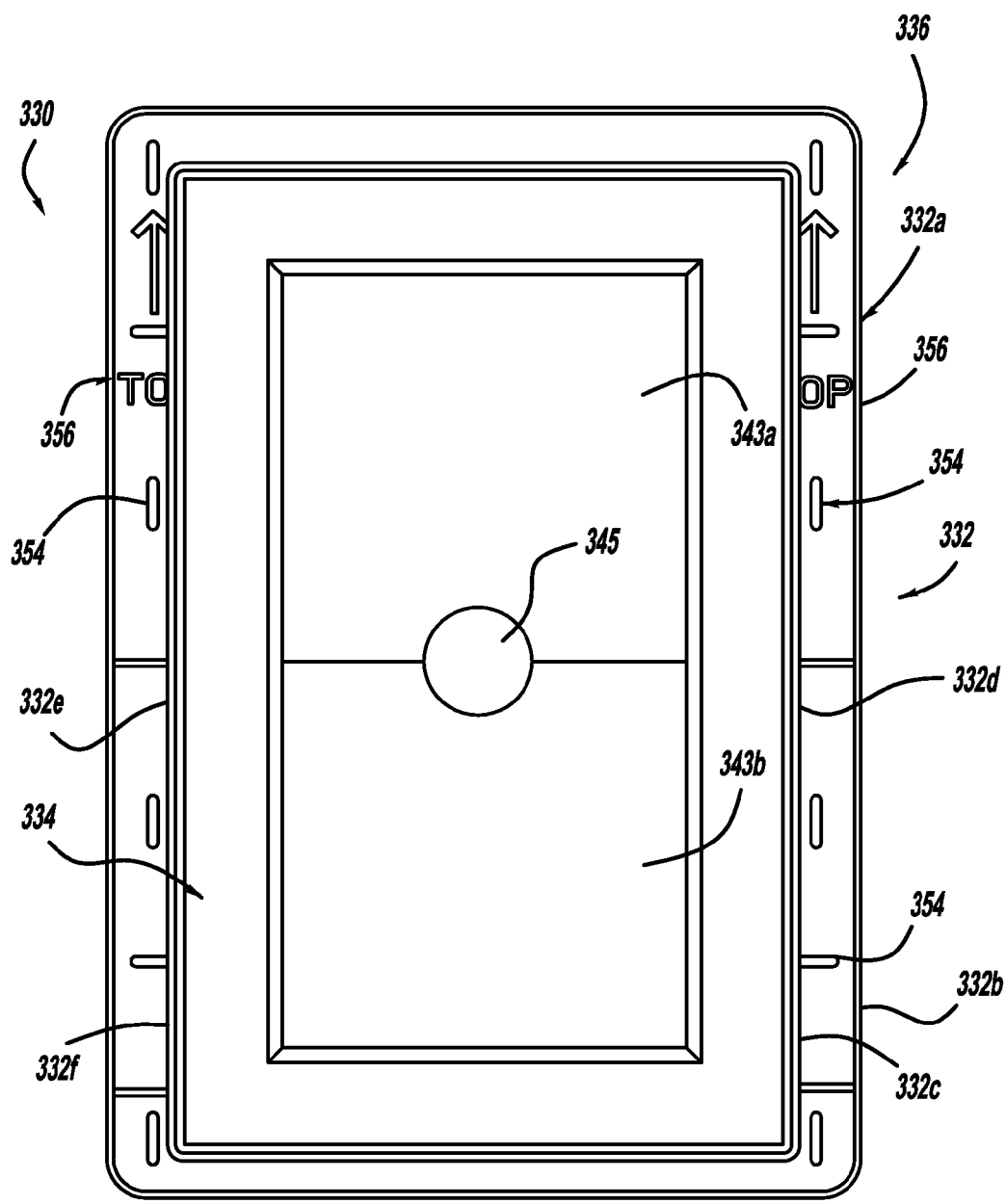
FIG. 16 is a front view of a fourth embodiment of a wall mount assembly according to the present invention.
Figure 17:
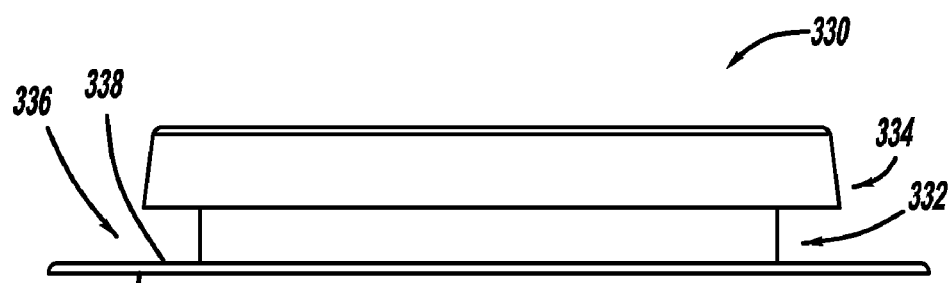
FIG. 17 is a bottom view of the wall mount assembly shown in FIG. 16.
Figure 18:
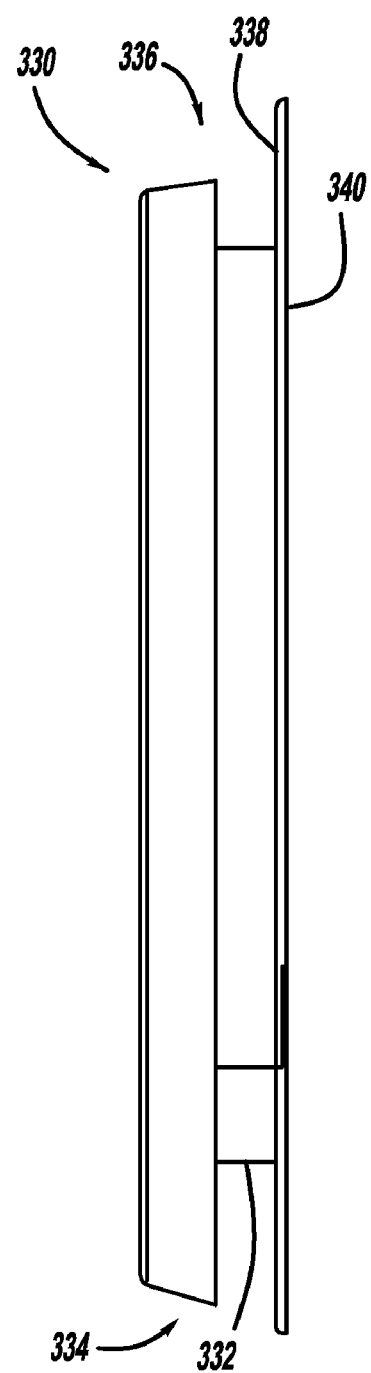
FIG. 18 is a side view of the wall mount assembly shown in FIG. 16.
Figure 19:
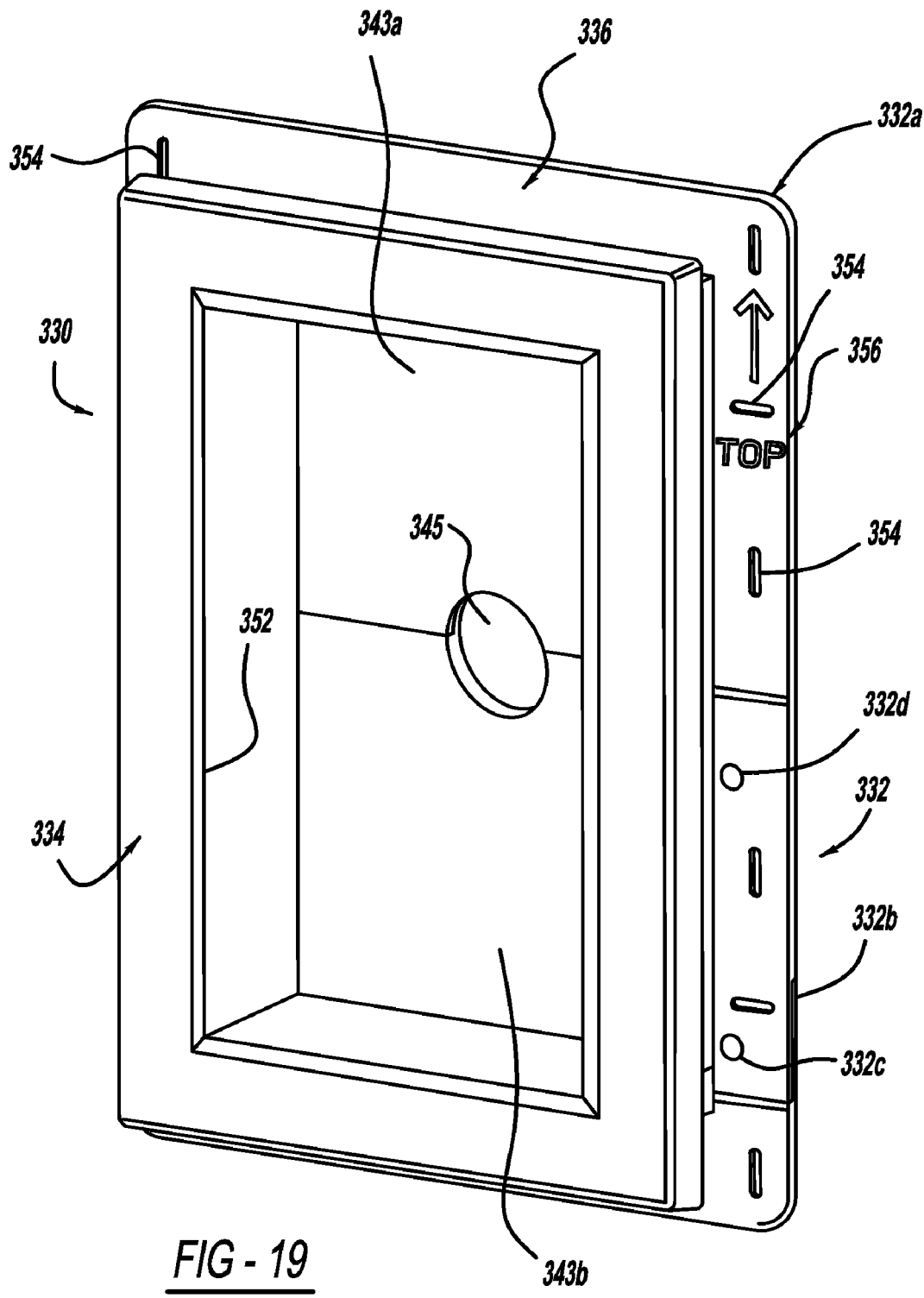
FIG. 19 is a front perspective view of the wall mount assembly shown in FIG. 16.
Figure 20:
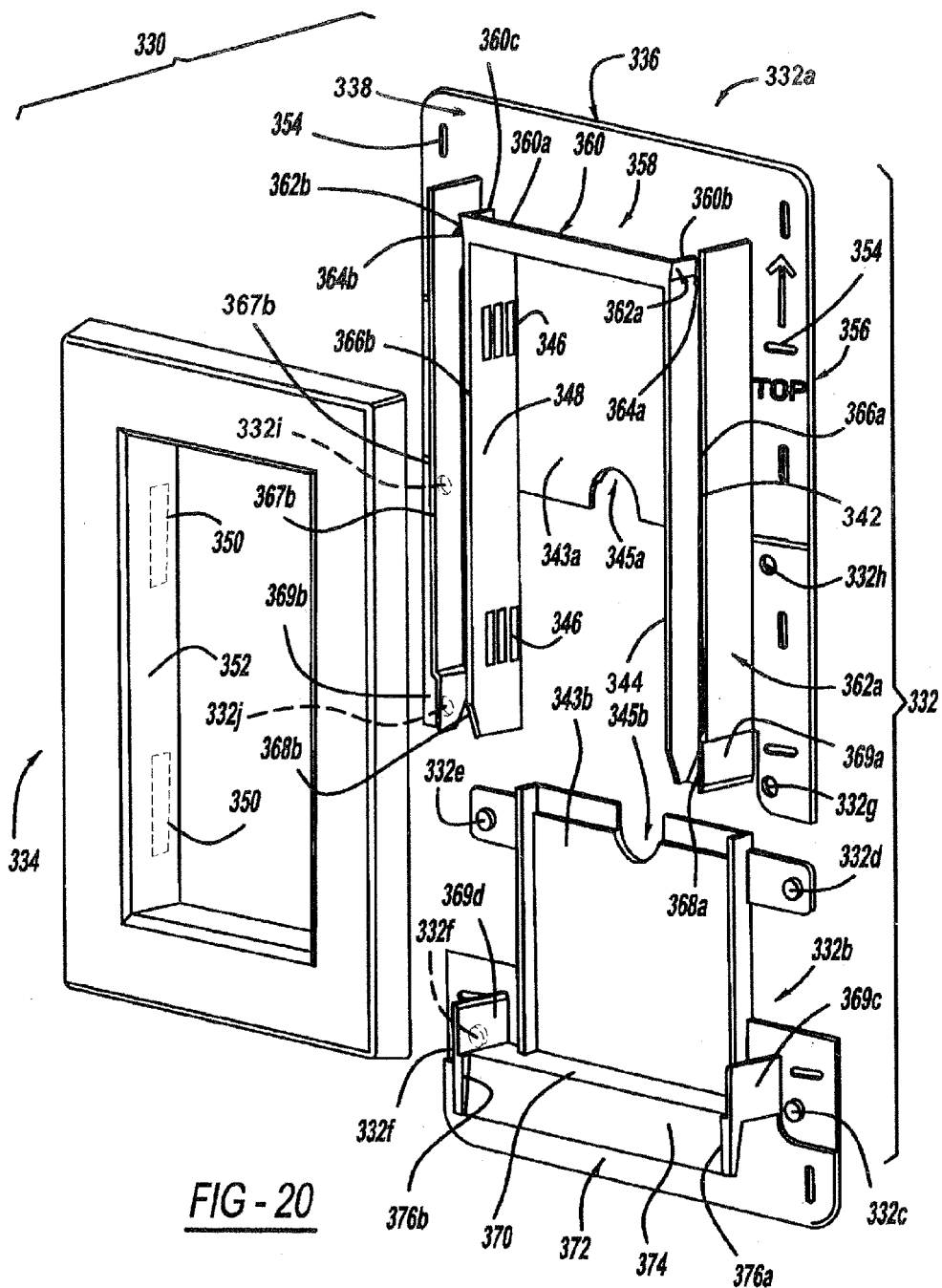
FIG. 20 is an exploded front perspective view of the wall mount assembly shown in FIG. 16.
Figure 21:
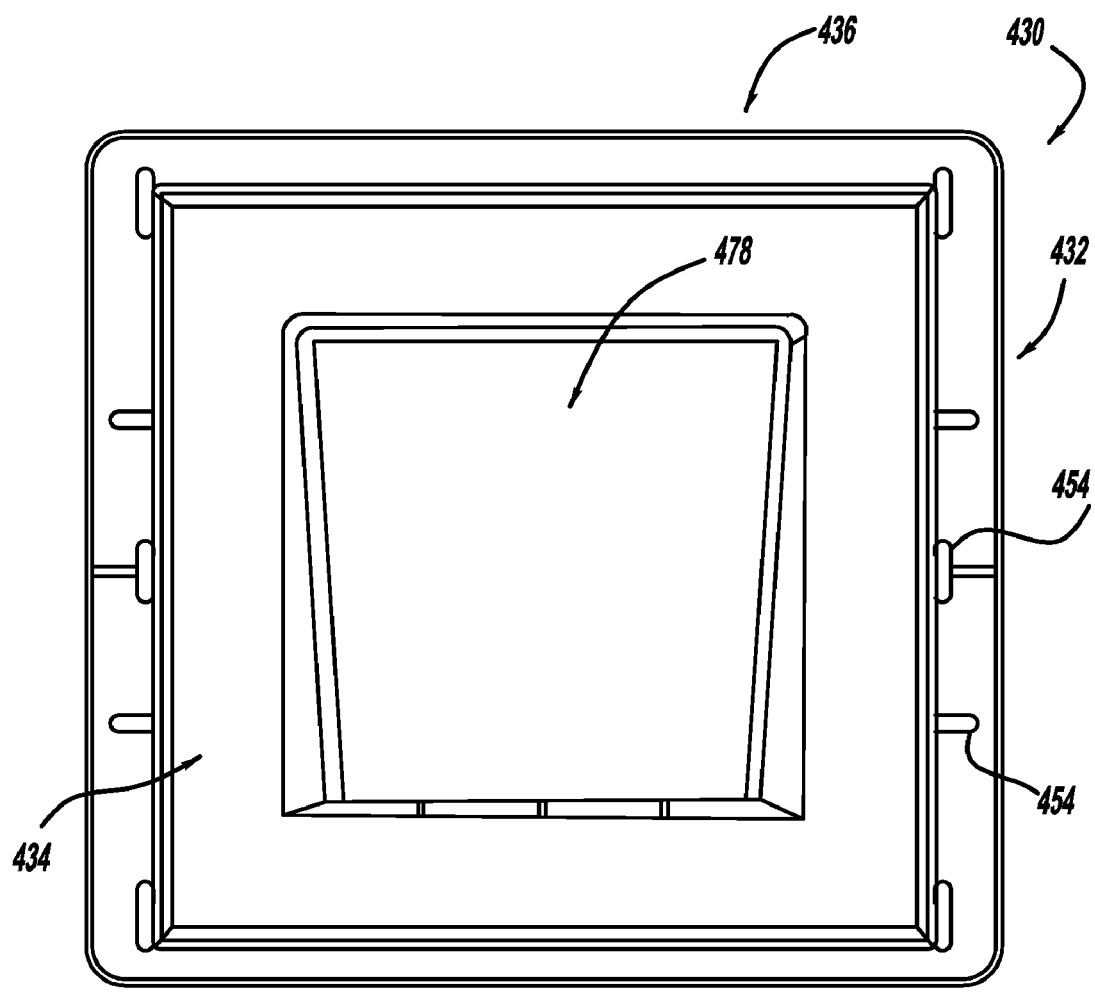
FIG. 21 is a front view of a fifth embodiment of a wall mount assembly according to the present invention.
Figure 22:
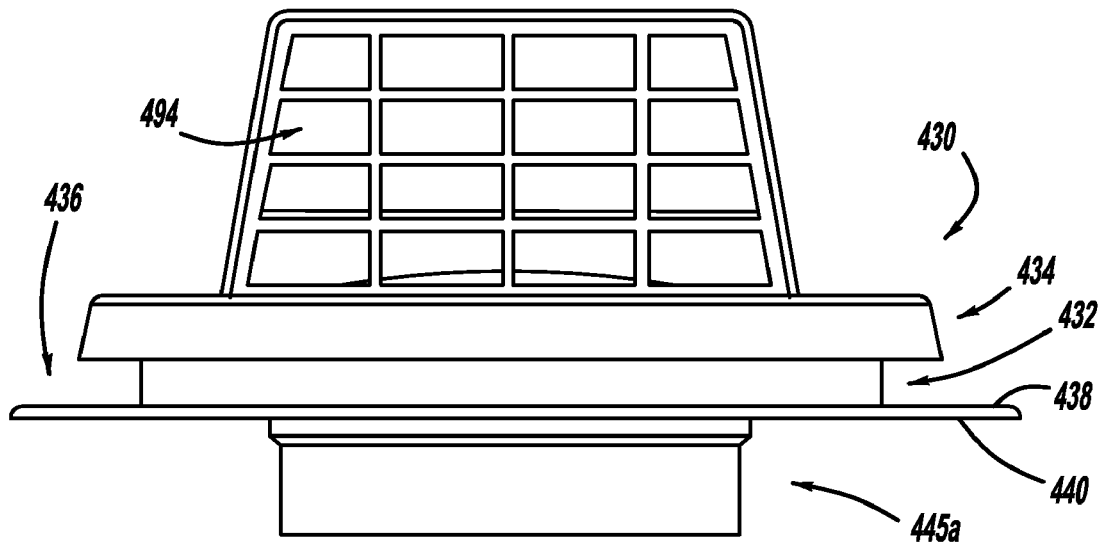
FIG. 22 is a bottom view of the wall mount assembly shown in FIG. 21.
Figure 23:
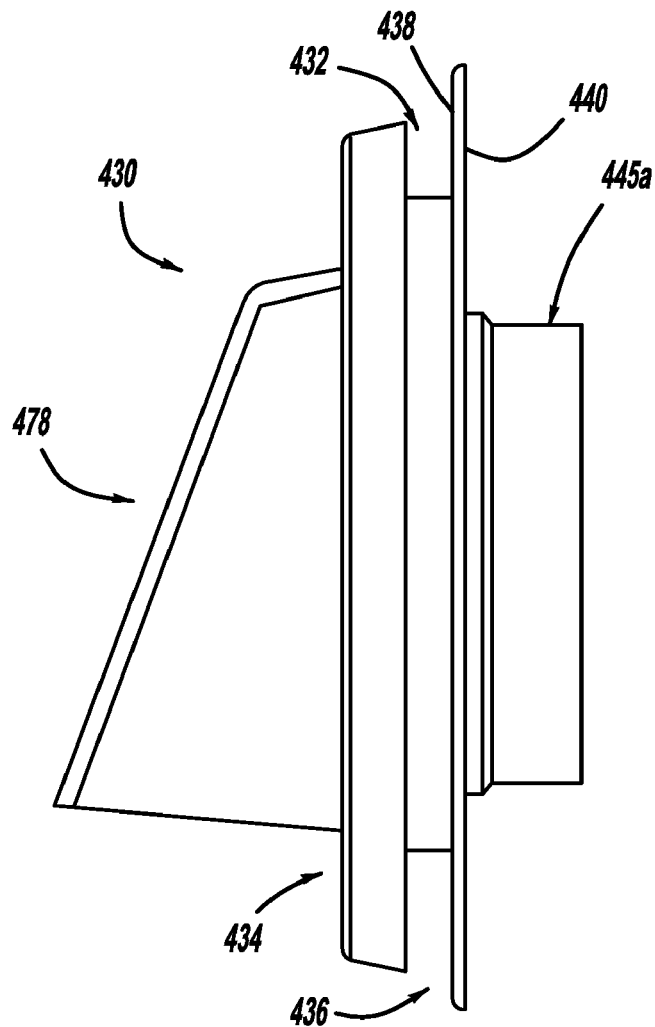
FIG. 23 is a side view of the wall mount assembly shown in FIG. 21.
Figure 24:
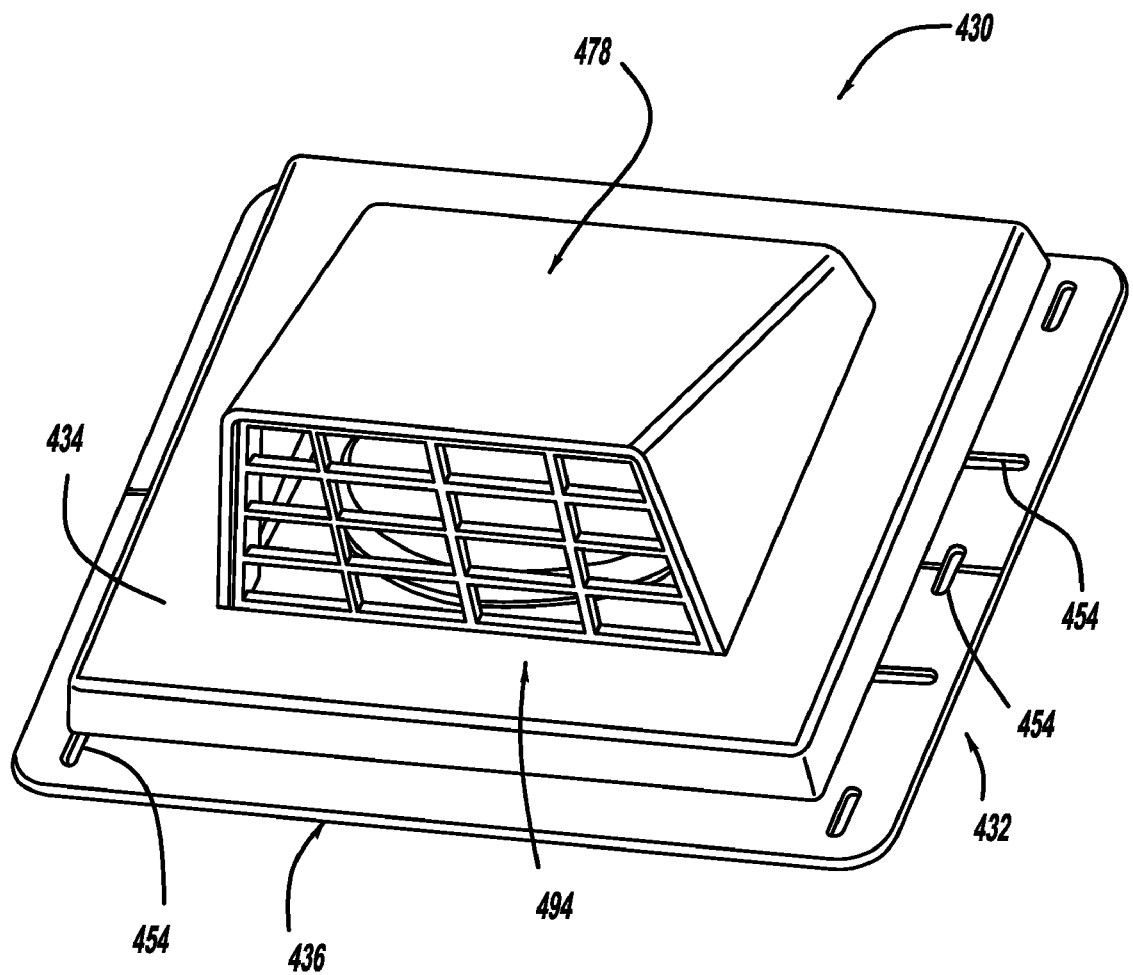
FIG. 24 is a front perspective view of the wall mount assembly shown in FIG. 21.
Figure 25:
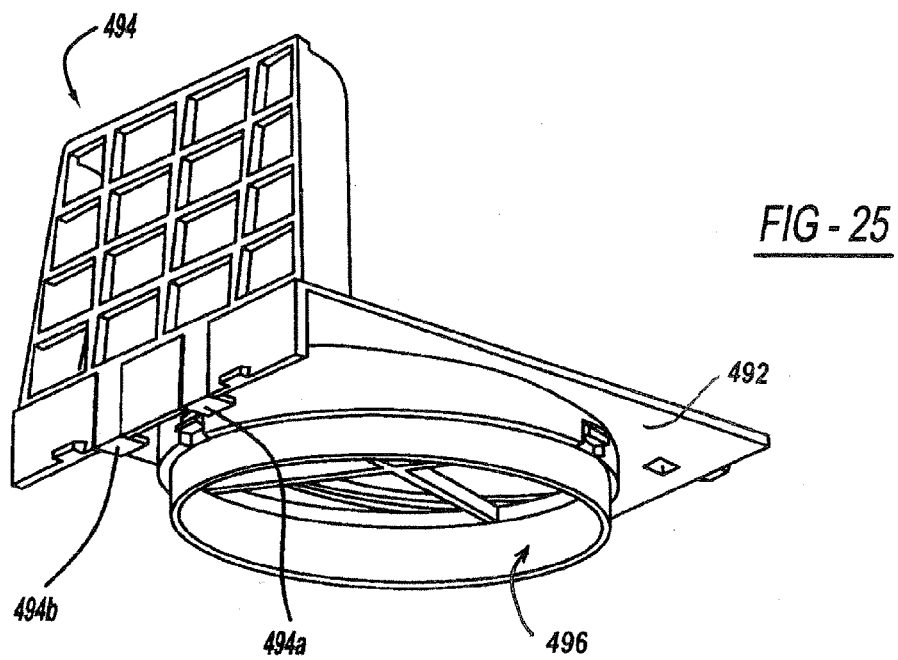
FIG. 25 is a front perspective view of a birdcage assembly of the wall mount assembly shown in FIG. 21.
Figure 26:
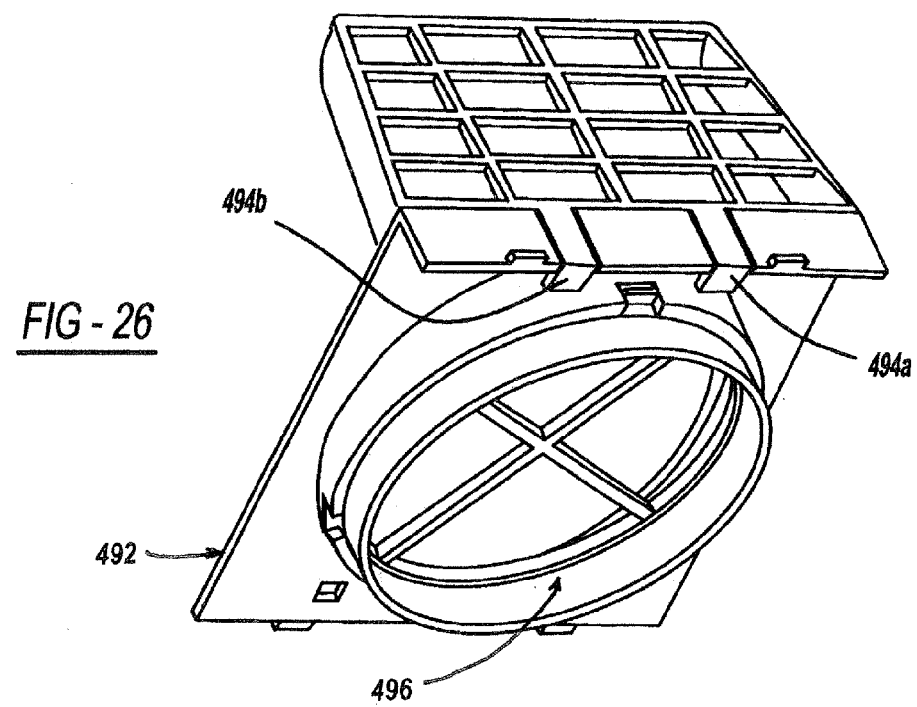
FIG. 26 is a rear perspective view of a birdcage assembly of the wall mount assembly shown in FIG. 21.

The following description of the preferred embodiment(s) is merely exemplary in nature and is in no way intended to limit the invention, or uses.

Referring generally to the Figures, a wall mount assembly is shown in accordance with the general teachings of the present invention. FIGS. 1-5 illustrate a first embodiment of the wall mount assembly 30 as an exterior all-purpose wall mount, FIGS. 6-10 illustrate a second embodiment of a wall mount assembly 130 as an exterior light fixture mount, FIGS. 11-15 illustrate a third embodiment of a wall mount assembly 230 as an exterior electrical outlet mount, FIGS. 16-20 illustrate a fourth embodiment of a wall mount assembly 330 as an exterior hose bib mount, and FIGS. 21-29 illustrate a fifth embodiment of a wall mount assembly 430 as an exterior exhaust vent mount.

The wall mount assemblies 30, 130, 230, 330, and 430, respectively, can be mounted to a building (not shown) having a siding material (not shown) disposed thereon. The present invention is particularly useful when used in conjunction with a cement siding material (e.g., cement board); however, the present invention can also be practiced with other siding materials, such as vinyl (or other plastic materials) or aluminum (or other metal materials) siding materials. Additionally, wood type sidings, e.g., cedar shingles and/or the like, can also be used in conjunction with the present invention.

Referring to FIGS. 1-5, the wall mount assembly 30 generally comprises a base member 32 and a cover member 34.

The base member 32 includes a generally planar peripheral flange member 36 having a front surface 38 and a rear surface 40 and that extends along an outer periphery of the base member 32. Inboard of the peripheral flange member 36, an upstanding wall 42 extends along an inner periphery 44 and extends from the front surface 38 and away from the rear surface 40. The wall 42 can define a panel area 43 comprising an aperture (not shown) for allowing throughput of material or objects when the base member 32 is mounted over a cut hole (not shown) in a building wall. Alternatively, the aperture (not shown) can be provided in the shown panel member area 43 that can be selectively trimmed (e.g., via hole patterns, perforations, and/or the like) to form several different types of apertures therein.

The wall 42 is provided with at least one engagement surface 46 formed on an outer surface 48 thereof. The intended purpose of the engagement surface 46 is to selectively mate with an engagement surface 50 formed on an inner surface of a peripheral wall 52 of the cover member 34. By way of a non-limiting example, multiple engagement surfaces 46, 50, respectively, can be provided to allow variable depth placement of the cover member 34 relative to the base member 32. By way of a non-limiting example, the engagement surfaces 46, 50, respectively, can be formed as slots, tabs, and/or the like, such that the respective engagement surfaces are operable to easily engage and disengage from one another.

The wall mount assembly 30 can be used to secure various fixtures to the building, such as light fixtures, house numbers, ornamental fixtures, and the like. When the wall mount assembly 30 is mounted to the building, the flange member 36 abuts against the building surface, wherein the siding material can be overlaid on top of the flange member 36 to create an aesthetic appearance. The cover member 34 can then be fastened to the base member 32 to create an ever greater aesthetic appearance. At least one aperture 54 (in various orientations and/or sizes) can be formed around the circumference of the flange member 36 for receiving fastening members (e.g., nails, screws, and/or the like), sealants, adhesives, and/or the like. Additionally, indicia 56 can be provided to provide an indexing function to properly orient the base member 32 before installation. The base member 32 can be any desired geometrical shape, such as rectangular, square, circular, or the like, depending upon the application of the wall mount assembly 30.

Disposed about the wall 42 is a water deflection system 58. The water deflection system 58 is intended to deflect any water (e.g., rain) from infiltrating into the cut hole (not shown) and thus causing water damage in the wall surface of the building and surrounding areas. A trough 60 is provided to accumulate any water that is seeping or dripping down onto the upper regions of the base member 32 and prevent it from any further downward flow, e.g., into the aperture 43 and/or the cut hole (not shown). The trough 60 can include a back wall 60a and a pair of side walls, 60b and 60c. In order to transport (e.g., passively) the accumulated water out of the trough 60, a pair of ramp members 62a, 62b, respectively, is provided on each side of the trough 60. The trough 60 can be slanted towards the ramps 62a, 62b, respectively, to ensure that the water does not accumulate thereon. The ramps 62a, 62b, respectively, can be slanted downwardly to ensure that the water does not accumulate thereon. The water then flows over the ramps 62a, 62b, respectively, onto ramps 64a, 64b, respectively, which can also be slanted downwardly to ensure that the water does not accumulate thereon. The water, acted upon by gravity, then falls down elongated passageways 66a, 66b, respectively, (defined by sidewalls 67a, 67b, respectively) until reaching ramps 68a, 68b, respectively. It should be noted that the sidewalls 67a, 67b, respectively, preferably extend above the top of the trough 60 so as to ensure that no traveling water is able to spill or splash above the tops of the sidewalls 67a, 67b, respectively. The ramps 68a, 68b, respectively, can be slanted inwardly to ensure that the water does not accumulate thereon. An optional angled surface 70 then allows the water to flow downwardly along a skirt member 72. The skirt member 72 is defined by slanted backwall 74 and angled lower sidewalls 76a, 76b, respectively. The skirt member 72 can be slanted outwardly (e.g., along backwall 74) to ensure that the water does not accumulate thereon. The water then flows down the exterior of the siding material or onto the ground. In this manner, substantially all of any flowing water is kept away from the cut hole (not shown) and thus cannot infiltrate the building. It should also be noted that the cover member 34 is operable to hide or obscure the entire water deflection system 58. Additionally, the precise degrees of each of the angles of the respective ramps, passageways, surfaces, and skirts is not thought to be critical to the success of the invention, provided that the water is suitably allowed to flow passively outwardly and/or downwardly away from the cut hole (not shown) as described above.

Referring to FIGS. 6-10, the wall mount assembly 130 is very similar to the wall mount assembly 30 shown in FIGS. 1-5, and also generally comprises a base member 132 and a cover member 134.

The base member 132 includes a generally planar peripheral flange member 136 having a front surface 138 and a rear surface 140 and that extends along an outer periphery of the base member 132. Inboard of the peripheral flange member 136, an upstanding wall 142 extends along an inner periphery 144 and extends from the front surface 138 and away from the rear surface 140. The wall 142 defines the area of a panel member 143 that is provided with at least one aperture 145 for receiving materials or equipment such as wires, cables, and/or the like.

The wall 142 is provided with at least one engagement surface 146 formed on an outer surface 148 thereof. The intended purpose of the engagement surface 146 is to selectively mate with an engagement surface 150 formed on an inner surface of a peripheral wall 152 of the cover member 134. By way of a non-limiting example, multiple engagement surfaces 146, 150, respectively, can be provided to allow variable depth placement of the cover member 134 relative to the base member 132. By way of a non-limiting example, the engagement surfaces 146, 150, respectively, can be formed as slots, tabs, and/or the like, such that the respective engagement surfaces are operable to easily engage and disengage from one another.

The wall mount assembly 130 can be used to secure various fixtures to the building, such as light fixtures, other electrical fixtures, and the like. When the wall mount assembly 130 is mounted to the building, the flange member 136 abuts against the building surface, wherein the siding material can be overlaid on top of the flange member 136 to create an aesthetic appearance. The cover member 134 can then be fastened to the base member 132 to create an ever greater aesthetic appearance. At least one aperture 154 (in various orientations and/or sizes) can be formed around the circumference of the flange member 136 for receiving fastening members (e.g., nails, screws, and/or the like), sealants, adhesives, and/or the like. Additionally, indicia 156 can be provided to provide an indexing function to properly orient the base member 132 before installation. The base member 132 can be any desired geometrical shape, such as rectangular, square, circular, or the like, depending upon the application of the wall mount assembly 130.

Disposed about the wall 142 is a water deflection system 158. The water deflection system 158 is intended to deflect any water (e.g., rain) from infiltrating into the cut hole (not shown) and thus causing water damage in the wall surface of the building and surrounding areas. A trough 160 is provided to accumulate any water that is seeping or dripping down onto the upper regions of the base member 132 and prevent it from any further downward flow, e.g., into the aperture 145 and/or the cut hole (not shown). The trough 160 can include a back wall 160a and a pair of side walls, 160b and 160c. In order to transport (e.g., passively) the accumulated water out of the trough 160, a pair of ramp members 162a, 162b, respectively, is provided on each side of the trough 160. The trough 160 can be slanted towards the ramps 162a, 162b, respectively, to ensure that the water does not accumulate thereon. The ramps 162a, 162b, respectively, can be slanted downwardly to ensure that the water does not accumulate thereon. The water then flows over the ramps 162a, 162b, respectively, onto ramps 164a, 164b, respectively, which can also be slanted downwardly to ensure that the water does not accumulate thereon. The water, acted upon by gravity, then falls down elongated passageways 166a, 166b, respectively, (defined by sidewalls 167a, 167b, respectively) until reaching ramps 168a, 168b, respectively. It should be noted that the sidewalls 167a, 167b, respectively, preferably extend above the top of the trough 160 so as to ensure that no traveling water is able to spill or splash above the tops of the sidewalls 167a, 167b, respectively. The ramps 168a, 168b, respectively, can be slanted inwardly to ensure that the water does not accumulate thereon. An optional angled surface 170 then allows the water to flow downwardly along a skirt member 172. The skirt member 172 is defined by slanted backwall 174 and angled lower sidewalls 176a, 176b, respectively. The skirt member 172 can be slanted outwardly (e.g., along backwall 174) to ensure that the water does not accumulate thereon. The water then flows down the exterior of the siding material or onto the ground. In this manner, substantially all of any flowing water is kept away from the cut hole (not shown) and thus cannot infiltrate the building. It should also be noted that the cover member 134 is operable to hide or obscure the entire water deflection system 158. Additionally, the precise degrees of each of the angles of the respective ramps, passageways, surfaces, and skirts is not thought to be critical to the success of the invention, provided that the water is suitably allowed to flow passively outwardly and/or downwardly away from the cut hole (not shown) as described above.

Referring to FIGS. 11-15, the wall mount assembly 230 is very similar to the wall mount assembly 30 shown in FIGS. 1-5 and the wall mount assembly 130 shown in FIGS. 6-10, and also generally comprises a base member 232 and a cover member 234.

The base member 232 includes a generally planar peripheral flange member 236 having a front surface 238 and a rear surface 240 and that extends along an outer periphery of the base member 232. Inboard of the peripheral flange member 236, an upstanding wall 242 extends along an inner periphery 244 and extends from the front surface 238 and away from the rear surface 240. The wall 242 defines the area of a panel member 243 that is provided with at least one aperture 245 for receiving materials or equipment such as electrical outlets, receptacles, plugs, wires, cables, and/or the like.

The wall 242 is provided with at least one engagement surface 246 formed on an inner surface 248 thereof (the previously described embodiments has their respective engagement surfaces disposed on an outer surface of their respective walls). The intended purpose of the engagement surface 246 is to selectively mate with an engagement surface 250 (shown in phantom) formed on an outer surface of a peripheral wall 252 of the cover member 234. By way of a non-limiting example, multiple engagement surfaces 246, 250, respectively, can be provided to allow variable depth placement of the cover member 234 relative to the base member 232. By way of a non-limiting example, the engagement surfaces 246, 250, respectively, can be formed as slots, tabs, and/or the like, such that the respective engagement surfaces are operable to easily engage and disengage from one another.

The wall mount assembly 230 can be used to secure various fixtures to the building, such as electrical outlets, receptacles, plugs, and the like. When the wall mount assembly 230 is mounted to the building, the flange member 236 abuts against the building surface, wherein the siding material can be overlaid on top of the flange member 236 to create an aesthetic appearance. The cover member 234 can then be fastened to the base member 232 to create an ever greater aesthetic appearance. At least one aperture 254 (in various orientations and/or sizes) can be formed around the circumference of the flange member 236 for receiving fastening members (e.g., nails, screws, and/or the like), sealants, adhesives, and/or the like. Additionally, indicia 256 can be provided to provide an indexing function to properly orient the base member 232 before installation. The base member 232 can be any desired geometrical shape, such as rectangular, square, circular, or the like, depending upon the application of the wall mount assembly 230.

Disposed about the wall 242 is a water deflection system 258. The water deflection system 258 is intended to deflect any water (e.g., rain) from infiltrating into the cut hole (not shown) and thus causing water damage in the wall surface of the building and surrounding areas. A trough 260 is provided to accumulate any water that is seeping or dripping down onto the upper regions of the base member 232 and prevent it from any further downward flow, e.g., into the aperture 245 and/or the cut hole (not shown). The trough 260 can include a back wall 260a and a pair of side walls, 260b and 260c. In order to transport (e.g., passively) the accumulated water out of the trough 260, a pair of ramp members 262a, 262b, respectively, is provided on each side of the trough 260. The trough 260 can be slanted towards the ramps 262a, 262b, respectively, to ensure that the water does not accumulate thereon. The ramps 262a, 262b, respectively, can be slanted downwardly to ensure that the water does not accumulate thereon. The water then flows over the ramps 262a, 262b, respectively, onto ramps 264a, 264b, respectively, which can also be slanted downwardly to ensure that the water does not accumulate thereon. The water, acted upon by gravity, then falls down elongated passageways 266a, 266b, respectively, (defined by sidewalls 267a, 267b, respectively) until reaching ramps 268a, 268b, respectively. It should be noted that the sidewalls 267a, 267b, respectively, preferably extend above the top of the trough 260 so as to ensure that no traveling water is able to spill or splash above the tops of the sidewalls 267a, 267b, respectively. The ramps 268a, 268b, respectively, can be slanted inwardly to ensure that the water does not accumulate thereon. An optional angled surface 270a, 270b, respectively, then allows the water to flow downwardly along a skirt member 272. The skirt member 272 is defined by slanted backwall 274 and angled lower sidewalls 276a, 276b, respectively. The skirt member 272 can be slanted outwardly (e.g., along backwall 274) to ensure that the water does not accumulate thereon. The water then flows down the exterior of the siding material or onto the ground. In this manner, substantially all of any flowing water is kept away from the cut hole (not shown) and thus cannot infiltrate the building. It should also be noted that the cover member 234 is operable to hide or obscure the entire water deflection system 258. Additionally, the precise degrees of each of the angles of the respective ramps, passageways, surfaces, and skirts is not thought to be critical to the success of the invention, provided that the water is suitably allowed to flow passively outwardly and/or downwardly away from the cut hole (not shown) as described above.

Referring to FIGS. 16-20, the wall mount assembly 330 is very similar to the wall mount assembly 30 shown in FIGS. 1-5, the wall mount assembly 130 shown in FIGS. 6-10, and the wall mount assembly 230 shown in FIGS. 11-15, and also generally comprises a base member 332 and a cover member 334. However, this embodiment differs most significantly in that the base member 332 includes a first portion 332a and a second portion 332b that are selectively operable to mate with one another to form the base member 332. In this manner, the wall mount assembly 330 can be easily fitted around an object that has already been installed and that can not be easily dismantled or can not fit through an aperture formed in the wall mount assembly 330.

The first portion 332a includes a generally planar peripheral flange member 336 having a front surface 338 and a rear surface 340 and that extends along an outer periphery of the first portion 332a. Inboard of the peripheral flange member 336, an upstanding wall 342 extends along an inner periphery 344 and extends from the front surface 338 and away from the rear surface 340. The wall 342 defines the area of a panel member 343a that is provided with at least one cutout 345a for receiving materials or equipment such as water bibs, pipes, conduits, electrical outlets, receptacles, plugs, wires, cables, and/or the like.

The second portion 332b includes a plurality of tab members 332c, 332d, 332e, 332f, respectively, that are intended to selectively mate with and/or be received in a complementary number of apertures 332g, 332h, 332i, 332j, respectively, formed on the flange member 336. In this manner, the first portion 332a and the second portion 332b can be joined together to form the base member 332. Additionally, the second portion 332b also includes a panel member 343b that is provided with an area defining at least one cutout 345b for receiving materials or equipment such as water bibs, pipes, conduits, electrical outlets, receptacles, plugs, wires, cables, and/or the like. When the first portion 332a and the second portion 332b are joined together, the cutouts 345a, 345b, form an area defining an aperture 345 for receiving materials or equipment such as water bibs, pipes, conduits, electrical outlets, receptacles, plugs, wires, cables, and/or the like.

The wall 342 is provided with at least one engagement surface 346 formed on an inner surface 348 thereof (some of the previously described embodiments has their respective engagement surfaces disposed on an outer surface of their respective walls). The intended purpose of the engagement surface 346 is to selectively mate with an engagement surface 350 (shown in phantom) formed on an outer surface of a peripheral wall 352 of the cover member 334. By way of a non-limiting example, multiple engagement surfaces 346, 350, respectively, can be provided to allow variable depth placement of the cover member 334 relative to the base member 332. By way of a non-limiting example, the engagement surfaces 246, 250, respectively, can be formed as slots, tabs, and/or the like, such that the respective engagement surfaces are operable to easily engage and disengage from one another.

The wall mount assembly 330 can be used to secure various fixtures to the building, such as water bibs, pipes, conduits, electrical outlets, receptacles, plugs, and the like. When the wall mount assembly 330 is mounted to the building, the flange member 336 abuts against the building surface, wherein the siding material can be overlaid on top of the flange member 336 to create an aesthetic appearance. The cover member 334 can then be fastened to the base member 332 to create an ever greater aesthetic appearance. At least one aperture 354 (in various orientations and/or sizes) can be formed around the circumference of the flange member 336 for receiving fastening members (e.g., nails, screws, and/or the like), sealants, adhesives, and/or the like. Additionally, indicia 356 can be provided to provide an indexing function to properly orient the base member 332 before installation. The base member 332 can be any desired geometrical shape, such as rectangular, square, circular, or the like, depending upon the application of the wall mount assembly 330.

Disposed about the wall 342 is a water deflection system 358. The water deflection system 358 is intended to deflect any water (e.g., rain) from infiltrating into the cut hole (not shown) and thus causing water damage in the wall surface of the building and surrounding areas. A trough 360 is provided to accumulate any water that is seeping or dripping down onto the upper regions of the base member 332 and prevent it from any further downward flow, e.g., into the aperture 345 and/or the cut hole (not shown). The trough 360 can include a back wall 360a and a pair of side walls, 360b and 360c. In order to transport (e.g., passively) the accumulated water out of the trough 360, a pair of ramp members 362a, 362b, respectively, is provided on each side of the trough 360. The trough 360 can be slanted towards the ramps 362a, 362b, respectively, to ensure that the water does not accumulate thereon. The ramps 362a, 362b, respectively, can be slanted downwardly to ensure that the water does not accumulate thereon. The water then flows over the ramps 362a, 362b, respectively, onto ramps 364a, 364b, respectively, which can also be slanted downwardly to ensure that the water does not accumulate thereon. The water, acted upon by gravity, then falls down elongated passageways 366a, 366b, respectively, (defined by sidewalls 367a, 367b, respectively) until reaching ramps 368a, 368b, respectively. It should be noted that the sidewalls 367a, 367b, respectively, preferably extend above the top of the trough 360 so as to ensure that no traveling water is able to spill or splash above the tops of the sidewalls 367a, 367b, respectively. The ramps 368a, 368b, respectively, can be slanted inwardly to ensure that the water does not accumulate thereon. At this point, the remainder of the water deflection system 358 is formed on the second portion 332b. When the two portions 332a, 332b, respectively, are mated together, tab portions 369a, 369b, respectively, formed on the ends of sidewalls 367a, 367b, respectively, mate, abut against, or otherwise engage tab portions 369c, 369d, respectively, formed on the second portion 332b to form a continuous or substantially continuous wall. An optional angled surface 370 then allows the water to flow downwardly along a skirt member 372. The skirt member 372 is defined by slanted backwall 374 and angled lower sidewalls 376a, 376b, respectively. The skirt member 372 can be slanted outwardly (e.g., along backwall 374) to ensure that the water does not accumulate thereon. The water then flows down the exterior of the siding material or onto the ground. In this manner, substantially all of any flowing water is kept away from the cut hole (not shown) and thus cannot infiltrate the building. It should also be noted that the cover member 334 is operable to hide or obscure the entire water deflection system 358. Additionally, the precise degrees of each of the angles of the respective ramps, passageways, surfaces, and skirts is not thought to be critical to the success of the invention, provided that the water is suitably allowed to flow passively outwardly and/or downwardly away from the cut hole (not shown) as described above.

Referring to FIGS. 21-29, the wall mount assembly 430 differs significantly from the previously described wall mount assemblies. While wall mount assembly includes a base member 432, the cover member 434 is quite different from those of the previously described wall mount assemblies, as it comprised a vent or exhaust hood, e.g., those used in connection with dryer vents.

The base member 432 includes a generally planar peripheral flange member 436 having a front surface 438 and a rear surface 440 and that extends along an outer periphery of the base member 432. Inboard of the peripheral flange member 436, an upstanding wall 442 extends along an inner periphery 444 and extends from the front surface 438 and away from the rear surface 440. The wall 442 defines the area of a panel member 443 that is provided with at least one aperture 445 for receiving materials or equipment such as electrical outlets, receptacles, plugs, wires, cables, and/or the like. However, this embodiment also includes a substantially annular flange member 445a (e.g., which is intended to penetrate through the cut hole formed in the wall of the building) extending rearward from the aperture 445, e.g., for mating with an exhaust line emanating from a dryer.

The wall 442 is provided with at least one engagement surface 446 formed on an inner surface 448 thereof (some of the previously described embodiments has their respective engagement surfaces disposed on an outer surface of their respective walls). The intended purpose of the engagement surface 446 is to selectively mate with an engagement surface 450 (shown in FIG. 28) formed on an outer surface of a peripheral wall 452 of the cover member 434. By way of a non-limiting example, multiple engagement surfaces 446, 450, respectively, can be provided to allow variable depth placement of the cover member 434 relative to the base member 432. By way of a non-limiting example, the engagement surfaces 446, 450, respectively, can be formed as slots, tabs, and/or the like, such that the respective engagement surfaces are operable to easily engage and disengage from one another.

As previously noted, the wall mount assembly 430 is primarily intended to be used as a dryer vent, exhaust vent, or hood vent that can be secured to a building. When the wall mount assembly 430 is mounted to the building, the flange member 436 abuts against the building surface, wherein the siding material can be overlaid on top of the flange member 436 to create an aesthetic appearance. The cover member 434 can then be fastened to the base member 432 to create an ever greater aesthetic appearance. At least one aperture 454 (in various orientations and/or sizes) can be formed around the circumference of the flange member 436 for receiving fastening members (e.g., nails, screws, and/or the like), sealants, adhesives, and/or the like. Additionally, indicia (not shown) can be provided to provide an indexing function to properly orient the base member 432 before installation. The base member 432 can be any desired geometrical shape, such as rectangular, square, circular, or the like, depending upon the application of the wall mount assembly 430.

Figure 27:
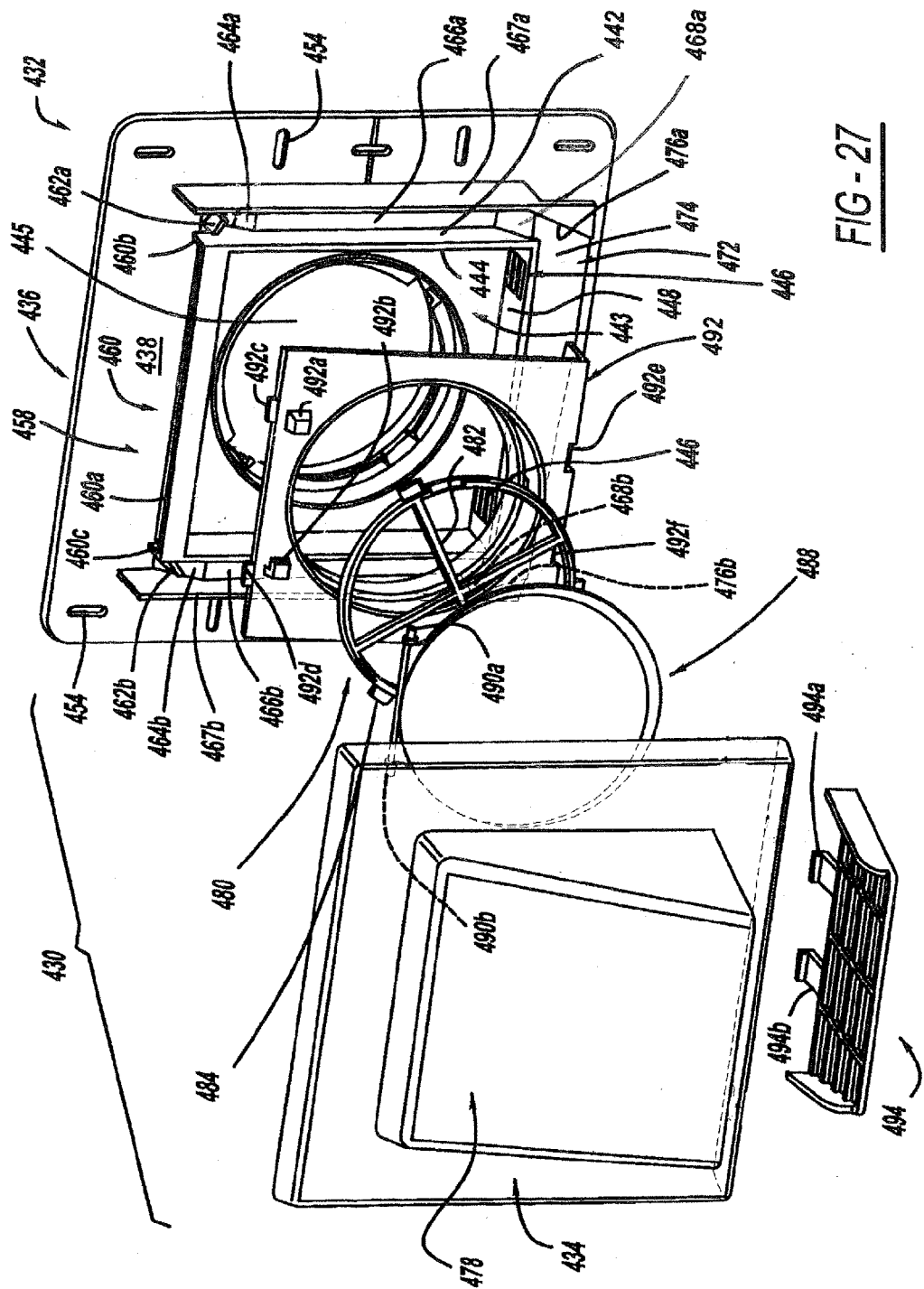
FIG. 27 is an exploded front perspective view of the wall mount assembly shown in FIG. 21.

As best seen in FIG. 27, disposed about the wall 442 is a water deflection system 458. The water deflection system 458 is intended to deflect any water (e.g., rain) from infiltrating into the cut hole (not shown) and thus causing water damage in the wall surface of the building and surrounding areas. A trough 460 is provided to accumulate any water that is seeping or dripping down onto the upper regions of the base member 432 and prevent it from any further downward flow, e.g., into the aperture 445 and/or the cut hole (not shown). The trough 460 can include a back wall 460a and a pair of side walls, 460b and 460c. In order to transport (e.g., passively) the accumulated water out of the trough 460, a pair of ramp members 462a, 462b, respectively, is provided on each side of the trough 460. The trough 460 can be slanted towards the ramps 462a, 462b, respectively, to ensure that the water does not accumulate thereon. The ramps 462a, 462b, respectively, can be slanted downwardly to ensure that the water does not accumulate thereon. The water then flows over the ramps 462a, 462b, respectively, onto ramps 464a, 464b, respectively, which can also be slanted downwardly to ensure that the water does not accumulate thereon. The water, acted upon by gravity, then falls down elongated passageways 466a, 466b, respectively, (defined by sidewalls 467a, 467b, respectively) until reaching ramps 468a, 468b, respectively. It should be noted that the sidewalls 467a, 467b, respectively, preferably extend above the top of the trough 460 so as to ensure that no traveling water is able to spill or splash above the tops of the sidewalls 467a, 467b, respectively. The ramps 468a, 468b, respectively, can be slanted outwardly to ensure that the water does not accumulate thereon. The water then flows downwardly along a skirt member 472. The skirt member 472 is defined by slanted backwall 474 and angled lower sidewalls 476a, 476b, respectively. The backwall 474 of skirt member 472 can be slanted outwardly to ensure that the water does not accumulate thereon. The water then flows down the exterior of the siding material or onto the ground. In this manner, substantially all of any flowing water is kept away from the cut hole (not shown) and thus cannot infiltrate the building. It should also be noted that the cover member 434 is operable to hide or obscure the entire water deflection system 458. Additionally, the precise degrees of each of the angles of the respective ramps, passageways, surfaces, and skirts is not thought to be critical to the success of the invention, provided that the water is suitably allowed to flow passively outwardly and/or downwardly away from the cut hole (not shown) as described above.

The cover member 434 includes a vent portion 478 that allows exhaust to be vented out through the cover member 434, and a flapper portion 479. Flapper portion 479 includes mounting member 492 having aperture 496 and a substantially circular retainer member 480 having a T-shaped member 482 formed thereon, and that includes several tab members 484 intended to mate with slot members 486 formed on the peripheral surface of the aperture 496. The retainer member 480 is intended to ensure that the flapper member 488 is not inadvertently drawn into the area of the flange 445*a*. The flapper member 488 is also substantially circular with a pair of spindle or pin members 490*a*, 490*b*, respectively, formed along a top surface thereof. The spindle members 490*a*, 490*b*, respectively, are intended to rotatably engage a pair of corresponding mounting portions 492*a*, 492*b*, respectively, formed on mounting member 492. The mounting member 492 is intended to be received within the inner surface of the wall 452 and secured thereto by tabs 492*c*, 492*d*, respectively, formed on an upper surface of the mounting member, with slots 498 formed in wall 452. A birdcage member 494 defining a screen and having tab members 494*a*, 494*b*, respectively, is held in place by mating with slots 492*e*, 492*f*, respectively, formed on the lower surface of the mounting member 492. That is, the birdcage member 494 is merely is held in place by one or more components resting thereupon.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mounting assembly operable to provide a wall mount for fastening to a structure, comprising: a base member, including: a substantially planar flange member having a front surface and a rear surface and a peripheral edge surface; a wall member extending upwardly away from the front surface and being inboard from the peripheral edge surface; and an area defining an aperture formed or bordered by the wall member; and a water deflection system for substantially preventing any water from entering the aperture or an area proximate thereto, including: a trough member located above a top surface of the wall member; and a downwardly or outwardly inclined ramp member in fluid communication with the trough member for allowing water contained in the trough member to flow downwardly or outwardly onto the ramp member so as to substantially prevent any water from entering the aperture or an area proximate thereto; and a skirt member in fluid communication with the ramp member and being located below a bottom surface of the wall member.

2. The invention according to claim 1, further comprising a passageway in fluid communication with the ramp member for allowing any water flowing onto the ramp member to flow downwardly along the passageway, the passageway being located parallel to a side surface of the wall member.

3. The invention according to claim 2, wherein the skirt member is in fluid communication with the passageway for allowing any water flowing down the passageway to flow downwardly or inwardly along the skirt member.

4. The invention according to claim 3, further comprising a second ramp member in fluid communication with the passageway and the skirt member for allowing any water flowing down the passageway to flow downwardly and inwardly onto the skirt member, the second ramp member being located parallel to a side surface of the wall member and perpendicular to the flange member.

5. The invention according to claim 3, further comprising a second ramp member in fluid communication with the passageway and the skirt member for allowing any water flowing down the passageway to flow downwardly onto the skirt member, the second ramp member being located parallel to a side surface of the wall member and non-perpendicular to the flange member.

6. The invention according to claim 3, further comprising a second ramp member in fluid communication with the passageway and the skirt member for allowing any water flowing down the passageway to flow downwardly and inwardly onto the skirt member, the second ramp member being located along an angled side surface of the skirt member.

7. The invention according to claim 1, further comprising a cover member selectively operable to be brought into removable engagement with the base member.

8. The invention according to claim 7, wherein the wall member includes an area defining at least one engagement surface formed therein.

9. The invention according to claim 8, wherein the cover member includes an area defining at least one engagement surface formed thereon.

10. The invention according to claim 9, wherein the at least one engagement surface of the wall member is selectively operable to be brought into removable engagement with the at least one engagement surface of the cover member.

11. The invention according to claim 7, wherein the cover member comprises a vent hood system.

12. The invention according to claim 11, wherein the vent hood system comprises:
a mounting member operable to engage a surface of the aperture formed or bordered by the wall member; and
a flap member having a pin member extending therefrom, the pin member being selectively operable to be brought into removable rotational engagement with the mounting member.

13. The invention according to claim 12, wherein the vent hood system further comprises a removable screen member having at least one tab member extending from a surface thereof, the at least one tab member being selectively operable to be brought into removable engagement with at least one slot member formed on a surface of the mounting member.

14. The invention according to claim 1, wherein the flange member includes at least one area defining an aperture formed therein for receiving an object selected from the group consisting of a fastener, a sealant, and combinations thereof.

15. The invention according to claim 1, wherein the aperture formed or bordered by the wall member includes an annular flange member formed thereabout, wherein the annular flange member extends outwardly away from the rear surface of the planar flange member.

16. A mounting assembly operable to provide a wall mount for fastening to a structure, comprising: a base member, including: a substantially planar flange member having a front surface and a rear surface and a peripheral edge surface; a wall member extending upwardly away from the front surface and being inboard from the peripheral edge surface; a substantially planar member bordered by the wall member and being substantially parallel to the front surface and the rear surface; and an area defining an aperture formed in the planar member; and a water deflection system for substantially preventing any water from entering the aperture or an area proximate thereto, including: a trough member located above a top surface of the wall member; a downwardly or outwardly inclined ramp member in fluid communication with the trough member for allowing water contained in the trough member to flow downwardly or outwardly onto the ramp member; a passageway in fluid communication with the ramp member for allowing any water flowing onto the ramp member to flow downwardly along the passageway so as to substantially prevent any water from entering the aperture or an area proximate thereto, the passageway being located parallel to a side surface of the wall member; and a skirt member in fluid communication with the passageway for allowing any water flowing down the passageway to flow downwardly or inwardly along the skirt member, the skirt member being located below a bottom surface of the wall member.

17. The invention according to claim 16, further comprising a second ramp member in fluid communication with the passageway and the skirt member for allowing any water flowing down the passageway to flow downwardly and inwardly onto the skirt member, the second ramp member being located parallel to a side surface of the wall member and perpendicular to the flange member.

18. The invention according to claim 16, further comprising a second ramp member in fluid communication with the passageway and the skirt member for allowing any water flowing down the passageway to flow downwardly onto the skirt member, the second ramp member being located parallel to a side surface of the wall member and non-perpendicular to the flange member.

19. The invention according to claim 16, further comprising a second ramp member in fluid communication with the passageway and the skirt member for allowing any water flowing down the passageway to flow downwardly and inwardly onto the skirt member, the second ramp member being located along an angled side surface of the skirt member.

20. The invention according to claim 16, further comprising a cover member selectively operable to be brought into removable engagement with the base member.

21. The invention according to claim 20, wherein the wall member includes an area defining at least one engagement surface formed therein.

22. The invention according to claim 21, wherein the cover member includes an area defining at least one engagement surface formed thereon.

23. The invention according to claim 22, wherein the at least one engagement surface of the wall member is selectively operable to be brought into removable engagement with the at least one engagement surface of the cover member.

24. The invention according to claim 20, wherein the cover member comprises a vent hood system.

25. The invention according to claim 24, wherein the vent hood system comprises:

a mounting member operable to engage a surface of the wall member; and
a flap member having a pin member extending therefrom, the pin member being selectively operable to be brought into removable rotational engagement with the mounting member.

26. The invention according to claim 25, wherein the vent hood system further comprises a removable screen member having at least one tab member extending from a surface thereof, the at least one tab member being selectively operable to be brought into removable engagement with at least one slot member formed on a surface of the mounting member.

27. The invention according to claim 16, wherein the flange member includes at least one area defining an aperture formed therein for receiving an object selected from the group consisting of a fastener, a sealant, and combinations thereof.

28. The invention according to claim 16, wherein the aperture formed or bordered by the wall member includes an annular flange member formed thereabout, wherein the annular flange member extends outwardly away from the rear surface of the planar flange member.

29. A mounting assembly operable to provide a wall mount for fastening to a structure, comprising:
 a base member, including:
  a substantially planar flange member having a front surface and a rear surface and a peripheral edge surface;
  a wall member extending upwardly away from the front surface and being inboard from the peripheral edge surface;
  a substantially planar member bordered by the wall member and being substantially parallel to the front surface and the rear surface; and
  an area defining an aperture formed in the planar member; and
 a water deflection system for substantially preventing any water from entering the aperture or an area proximate thereto, including:
  a trough member located above a top surface of the wall member;
  a downwardly or outwardly inclined ramp member in fluid communication with the trough member for allowing water contained in the trough member to flow downwardly or outwardly onto the ramp member;
  a passageway in fluid communication with the ramp member for allowing any water flowing onto the ramp member to flow downwardly along the passageway, the passageway being located parallel to a side surface of the wall member; and
  a skirt member in fluid communication with the passageway for allowing any water flowing down the passageway to flow downwardly or inwardly along the skirt member, the skirt member being located below a bottom surface of the wall member.

30. The invention according to claim 29, further comprising a second ramp member in fluid communication with the passageway and the skirt member for allowing any water flowing down the passageway to flow downwardly and inwardly onto the skirt member, the second ramp member being located parallel to a side surface of the wall member and perpendicular to the flange member.

31. The invention according to claim 29, further comprising a second ramp member in fluid communication with the passageway and the skirt member for allowing any water flowing down the passageway to flow downwardly onto the skirt member, the second ramp member being located parallel to a side surface of the wall member and non-perpendicular to the flange member.

32. The invention according to claim 29, further comprising a second ramp member in fluid communication with the passageway and the skirt member for allowing any water flowing down the passageway to flow downwardly and inwardly onto the skirt member, the second ramp member being located along an angled side surface of the skirt member.

33. The invention according to claim 29, further comprising a cover member selectively operable to be brought into removable engagement with the base member.

34. The invention according to claim 33, wherein the wall member includes an area defining at least one engagement surface formed therein.

35. The invention according to claim 34, wherein the cover member includes an area defining at least one engagement surface formed thereon.

36. The invention according to claim 35, wherein the at least one engagement surface of the wall member is selectively operable to be brought into removable engagement with the at least one engagement surface of the cover member.

37. The invention according to claim 33, wherein the cover member comprises a vent hood system.

38. The invention according to claim 37, wherein the vent hood system comprises:
   a mounting member operable to engage a surface of the aperture formed or bordered by the wall member; and
   a flap member having a pin member extending therefrom, the pin member being selectively operable to be brought into removable rotational engagement with the mounting member.

39. The invention according to claim 38, wherein the vent hood system further comprises a removable screen member having at least one tab member extending from a surface thereof, the at least one tab member being selectively operable to be brought into removable engagement with at least one slot member formed on a surface of the mounting member.

40. The invention according to claim 29, wherein the flange member includes at least one area defining an aperture formed therein for receiving an object selected from the group consisting of a fastener, a sealant, and combinations thereof.

41. The invention according to claim 29, wherein the aperture formed or bordered by the wall member includes an annular flange member formed thereabout, wherein the annular flange member extends outwardly away from the rear surface of the planar flange member.

* * * * *